US006215786B1

(12) United States Patent
Larson et al.

(10) Patent No.: US 6,215,786 B1
(45) Date of Patent: Apr. 10, 2001

(54) IMPLEMENTATION OF MULTI-STAGE SWITCHING NETWORKS

(75) Inventors: Brian Ralph Larson, Eagan; Steven Allen Murphy, Apple Valley, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/055,396

(22) Filed: Apr. 6, 1998

(51) Int. Cl.$^7$ .................................................. H04L 12/50
(52) U.S. Cl. ........................................ 370/386; 340/825.5
(58) Field of Search ..................................... 370/386, 411, 370/388, 462, 498, 389, 455; 359/222, 529; 340/825.8, 825.79, 825.5, 825.51

(56) References Cited

U.S. PATENT DOCUMENTS 4,833,468   5/1989   Larson et al. ...................... 340/825.8

*Primary Examiner*—Wellington Chin
*Assistant Examiner*—Prenell Jones
(74) *Attorney, Agent, or Firm*—Glenn W. Bowen; Patrick M. Hogan

(57) ABSTRACT

Multi-stage switching networks may be constructed and expanded from small to very large networks that are contained within a compact physical volume. This is accomplished by replication of a pre-selected network module containing switches by a rotating, folding and squaring process that substantially reduces the length of connections between switches. This geometry allows very large networks by inductively combining smaller networks into larger networks. In networks constructed with this geometry, the length of the longest connections between switches is proportional to the square root of the number of ports provided by the network.

10 Claims, 31 Drawing Sheets

BASELINE
NETWORK

32-NODE LAYERED NETWORK

NORMAL COLUMN ORDER

| Fig. 5a | Fig. 5c |
|---|---|
| Fig. 5b | Fig. 5d |

| Fig. 6a | Fig. 6b |
|---|---|
| Fig. 6c | Fig. 6d |

| Fig. 6c | Fig. 6d |
|---|---|
| Fig. 6a | Fig. 6b |

Figure 12a

| Fig. 12a | Fig. 12c |
|---|---|
| Fig. 12b | Fig. 12d |

| 1F | 1F | 17 | 17 | F | F | 7 | 7 |
| 1E | 1E | 16 | 16 | E | E | 6 | 6 |
| 1D | 1D | 15 | 15 | D | D | 5 | 5 |
| 1C | 1C | 14 | 14 | C | C | 4 | 4 |
| 1B | 1B | 13 | 13 | B | B | 3 | 3 |
| 1A | 1A | 12 | 12 | A | A | 2 | 2 |
| 19 | 19 | 11 | 11 | 9 | 9 | 1 | 1 |
| 18 | 18 | 10 | 10 | 8 | 8 | 0 | 0 |

*Figure 12b*

| Fig. 12a | Fig. 12c |
| Fig. 12b | Fig. 12d |

| Fig. 12a | Fig. 12c |
| Fig. 12b | Fig. 12d |

| Fig. 13a | Fig. 13b |
|---|---|
| Fig. 13c | Fig. 13d |

| Fig. 13a | Fig. 13b |
|---|---|
| Fig. 13b | Fig. 13d |

| Fig. 13a | Fig. 13b |
|---|---|
| Fig. 13b | Fig. 13d |

| Fig. 14a | Fig. 14c |
|---|---|
| Fig. 14b | Fig. 14d |

| Fig. 14a | Fig. 14c |
| Fig. 14b | Fig. 14d |

| Fig. 14a | Fig. 14b |
|---|---|
| Fig. 14c | Fig. 14d |

| Fig. 14a | Fig. 14c |
| --- | --- |
| Fig. 14b | Fig. 14d |

IMPLEMENTATION OF MULTI-STAGE SWITCHING NETWORKS

FIELD OF THE INVENTION

This invention is related to multi-stage interconnection switching networks which provide for the exchange of data between multiple electronic devices, and more particularly to geometrical patterns of semiconductor die and the associated wiring between such die to implement three-dimensional networks.

BACKGROUND OF THE INVENTION

Switching networks are commonly constructed with switches that are arranged into rows and columns such that all of the switches may be physically located on a common plane, such as on a single circuit panel or on a number of circuit panels adjacent one another. Interconnection wiring between the outputs and the inputs of the various switches is generally also accomplished in the same plane.

The prior art baseline network of FIG. 1, the reverse Banyan network of FIG. 2, the Cantor network of FIG. 3 or the two-planed layered network of FIG. 4, or any of the other layered networks that are described in U.S. Pat. No. 4,833,468, which is entitled "Layered Network" and which issued in the names of the inventors of this invention on May 23, 1989, are all examples of networks which may utilize the present invention. The wiring pattern and wiring topology of the interconnection wires between the switches are based upon the topology that applies to the particular type of networks to which the technique of the present invention is applied.

The layered network of the U.S. Pat. No. 4,833,468 has a number of desirable features, which were implemented in accordance with precise algorithms such that each network load size required a unique wiring topology and various different kinds of switching panels.

U.S. Pat. No. 4,833,468 is hereby incorporated by reference into this document. Although the layered network patent is used as an example to illustrate the invention, the invention may be applied to the various other types of multiple-stage switching networks, including baseline, Banyan and Cantor networks, the layered networks that may be constructed in accordance with the teachings of U.S. Pat. No. 4,833,468, and numerous other types of networks.

SUMMARY OF THE INVENTION

Multi-stage switching networks can be expanded from small to very large size networks that are assembled into compact volumes by using the techniques of the present invention. Transformation of the abstract topology design of the network to the physical geometry with the techniques taught by this invention takes three steps, which are called: "rotate", "fold" and "square" in the manner prescribed herein. The basic network module layout is first designed and then the layout is rotated end-around so that the two columns of switches of the module that require the longest wires are located at the middle of the module. The module layout is next conceptually folded in the middle so that columns equidistant from the center are placed together. The switches are then arranged into a regulator or square configuration so that for each switch in the configuration, every other switch whose row number differs by a single bit is located directly above-or-below or directly to the left-or-right of such switch. When switches are arranged in shapes like these, all wiring between switches is straight and short. The length of the longest wire grows proportionally to the square root of the number of connections made by the network, not linearly with the number of connections as in the prior art.

The geometry of the invention scales to larger networks by combining four smaller networks and adding an additional rectangular panel of switches and wiring for just the additional panel. Arbitrarily large networks may be built this way. The wiring between panels may be on rectangular, multi-layer printed circuits, or on thin ribbons of flexible circuitry. Both rectangular and ribbon wiring geometries may be used in a single network depending on distance between switches to be connected and other considerations. Finally, the networks need not necessarily be square in form. The switches may be configured into other shapes, including parallelograms, without losing the advantageous properties of the invention.

The present invention may also be applied to construct multi-stage networks, which range from small networks to large networks, all of which use the same type of switch. In addition, the construction of the networks in accordance of the present invention provides a number of advantages related to switch and wiring geometry.

BRIEF DESCRIPTION OF THE DRAWINGS

Various advantages of the invention will be best understood by reference to the following detailed description of the invention and the accompanying drawings wherein:

FIG. 9 applies to the switches of columns 1 and 4; and FIG. 10 applies to the switches of columns 2 and 3;

Figures 12A, 12B:
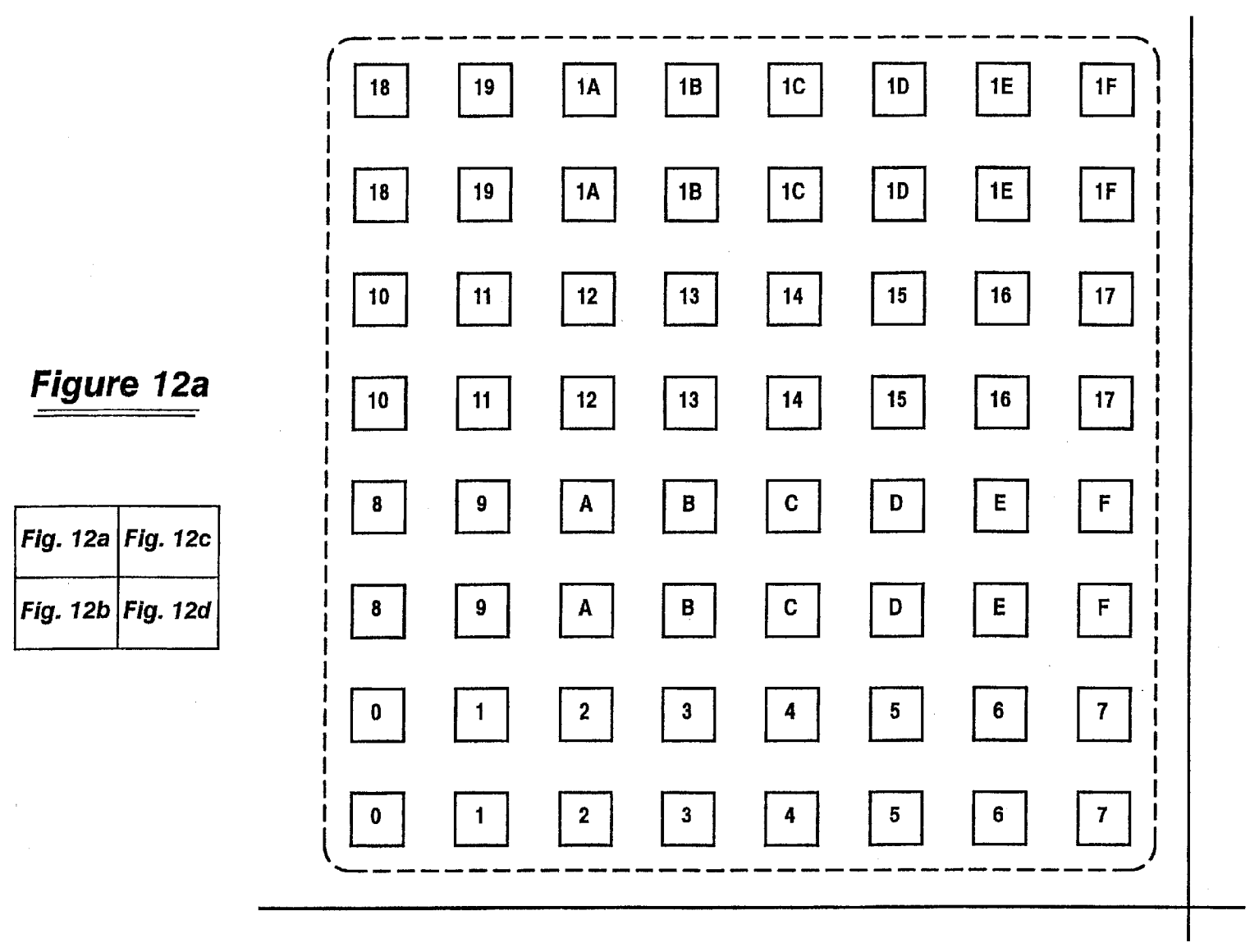
Figure 12C:
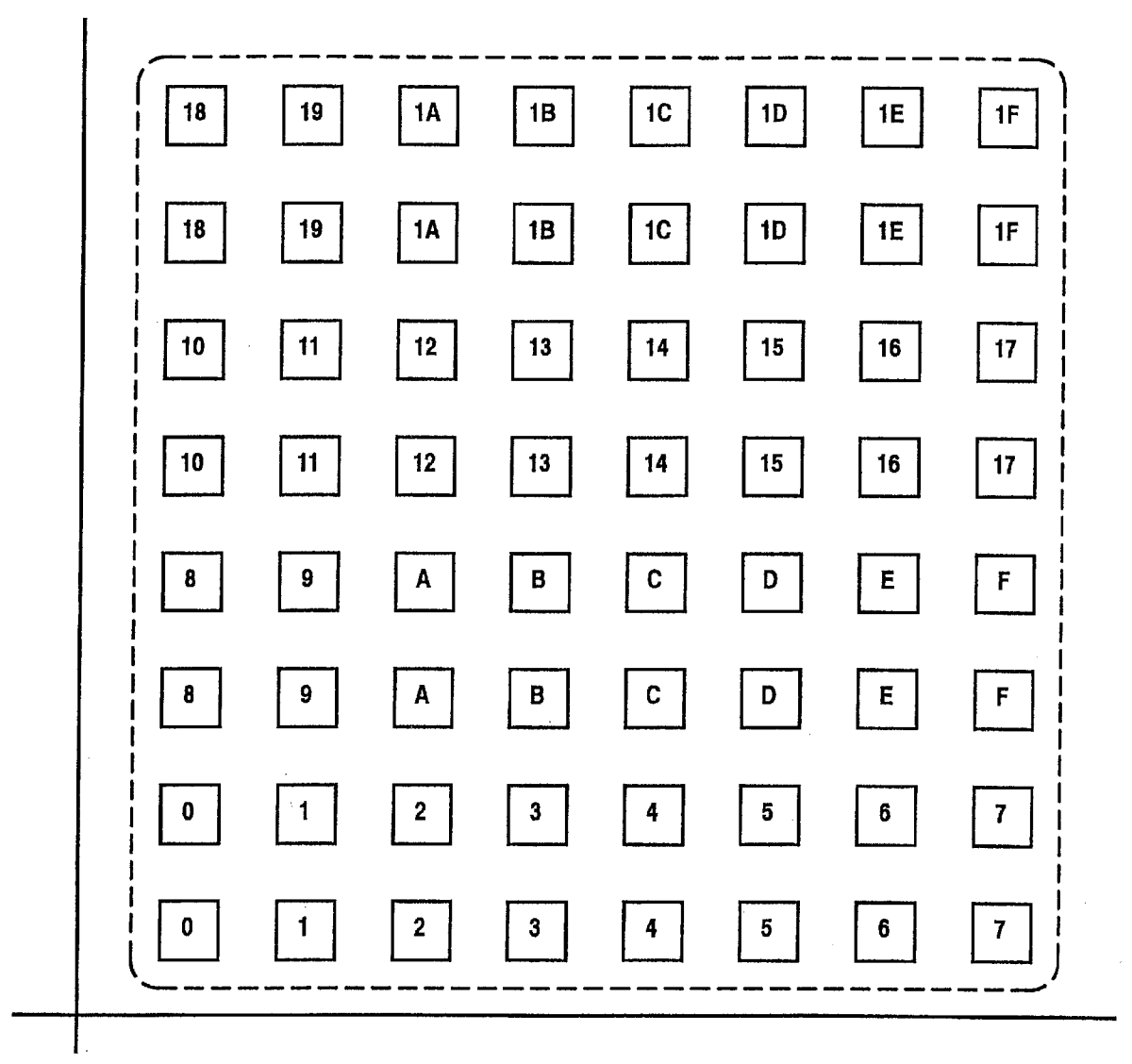

FIGS. 12a, 12b, 12c and 12d, arranged as shown in the associated block diagram, show the eight-column network represented at the bottom of FIG. 11, which shows how the switches of four card sections of the type shown in FIGS. 6I–6d may be combined to provide a 256-switch network;

FIGS. 14*a* and 4*b* show the wiring for the sectors A–D of the upper columns 3, 4 of switches for the embodiment of FIGS. 12*a*–12*d*, arranged as shown in the associated block diagram;

DESCRIPTION OF THE PREFERRED EMBODIMENT

This invention was named "four-square" to describe the way larger networks are made from smaller ones. The term "square" is used illustratively and is not intended to limit the physical embodiment to a square shape.

Figure 1:
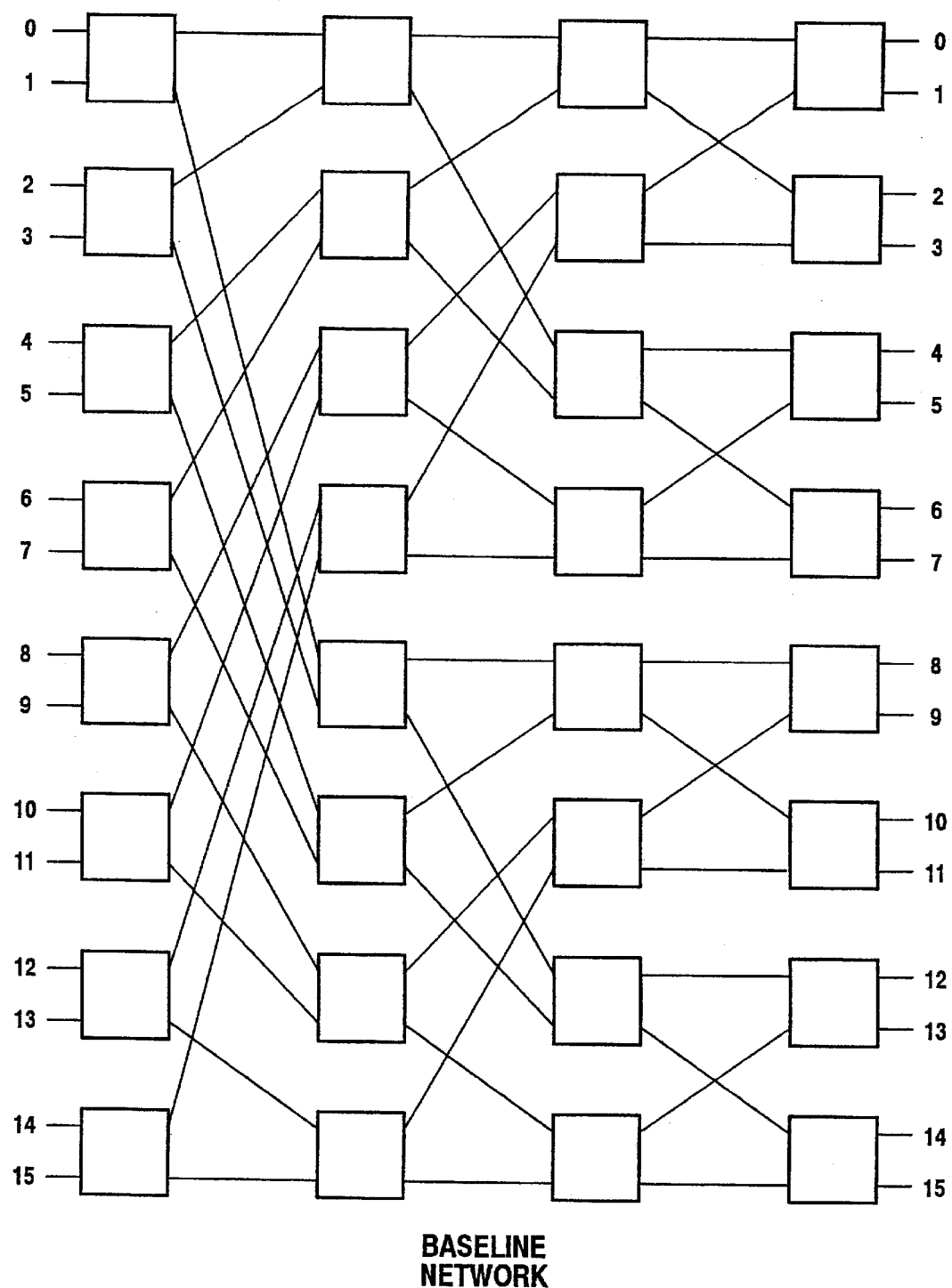
FIG. 1 is a block diagram of a prior art baseline network.
Figure 2:
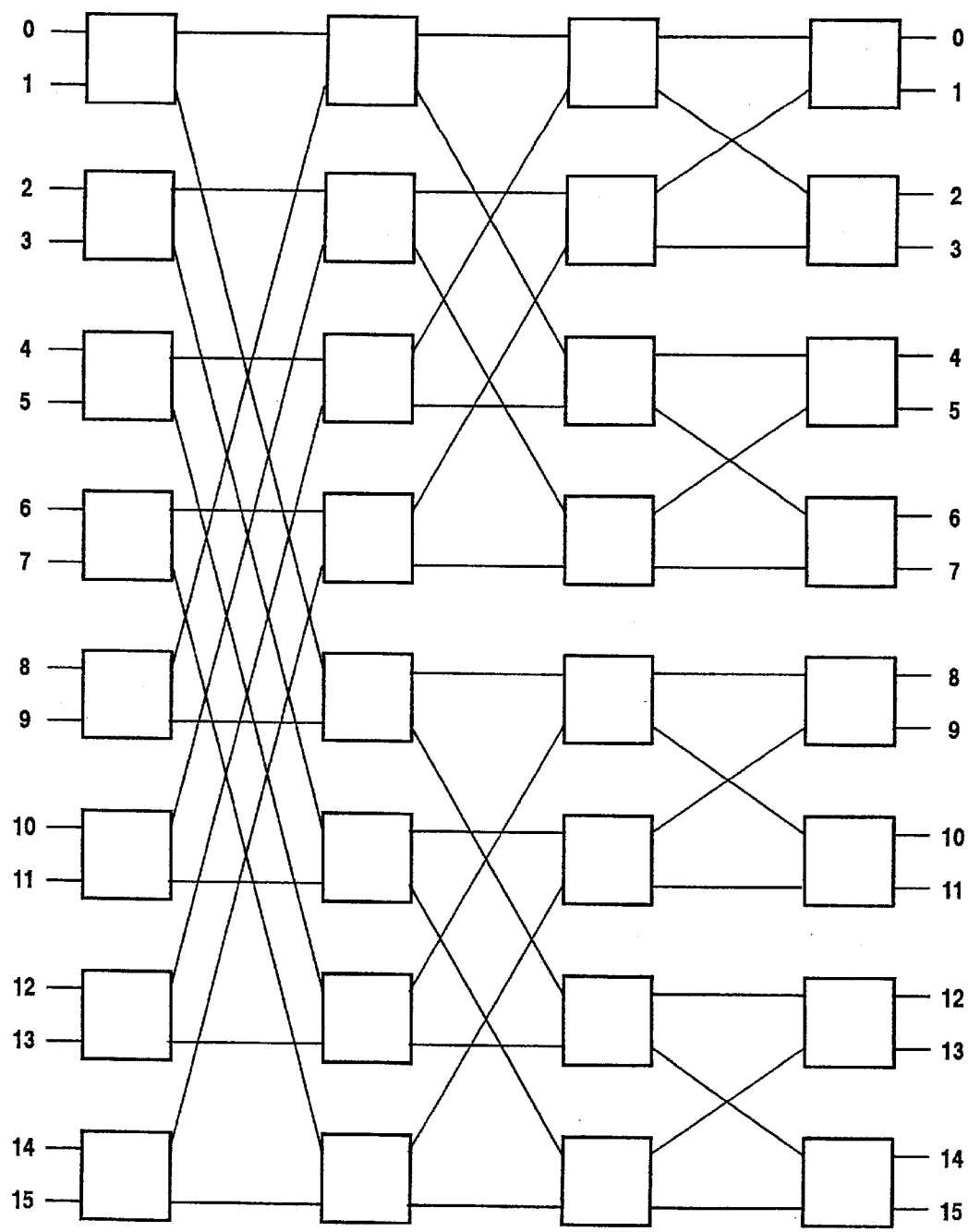
FIG. 2 is a block diagram of a prior art reverse Banyan network.
Figure 3:
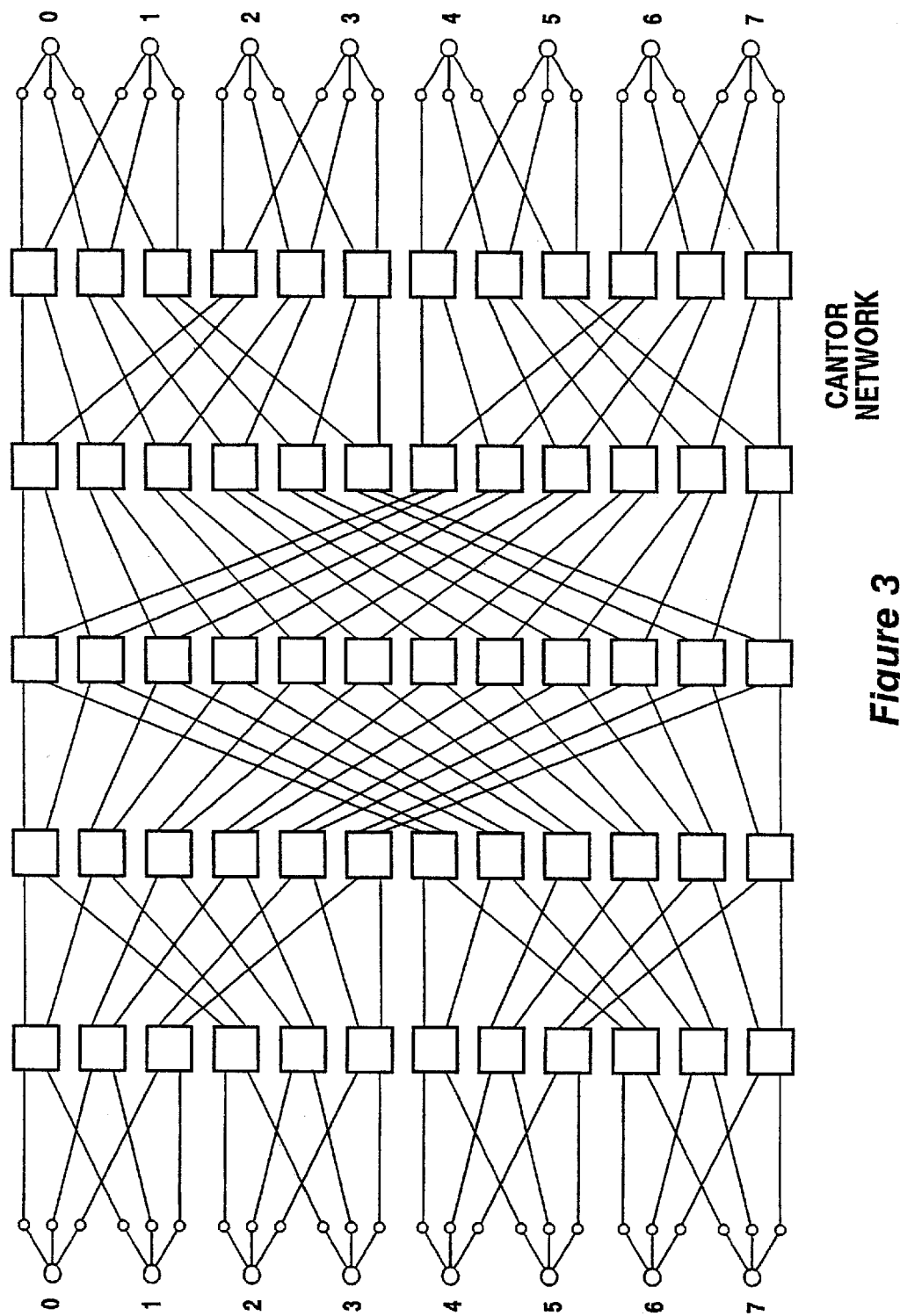
FIG. 3 is a block diagram of a prior art Cantor network.
Figure 4:
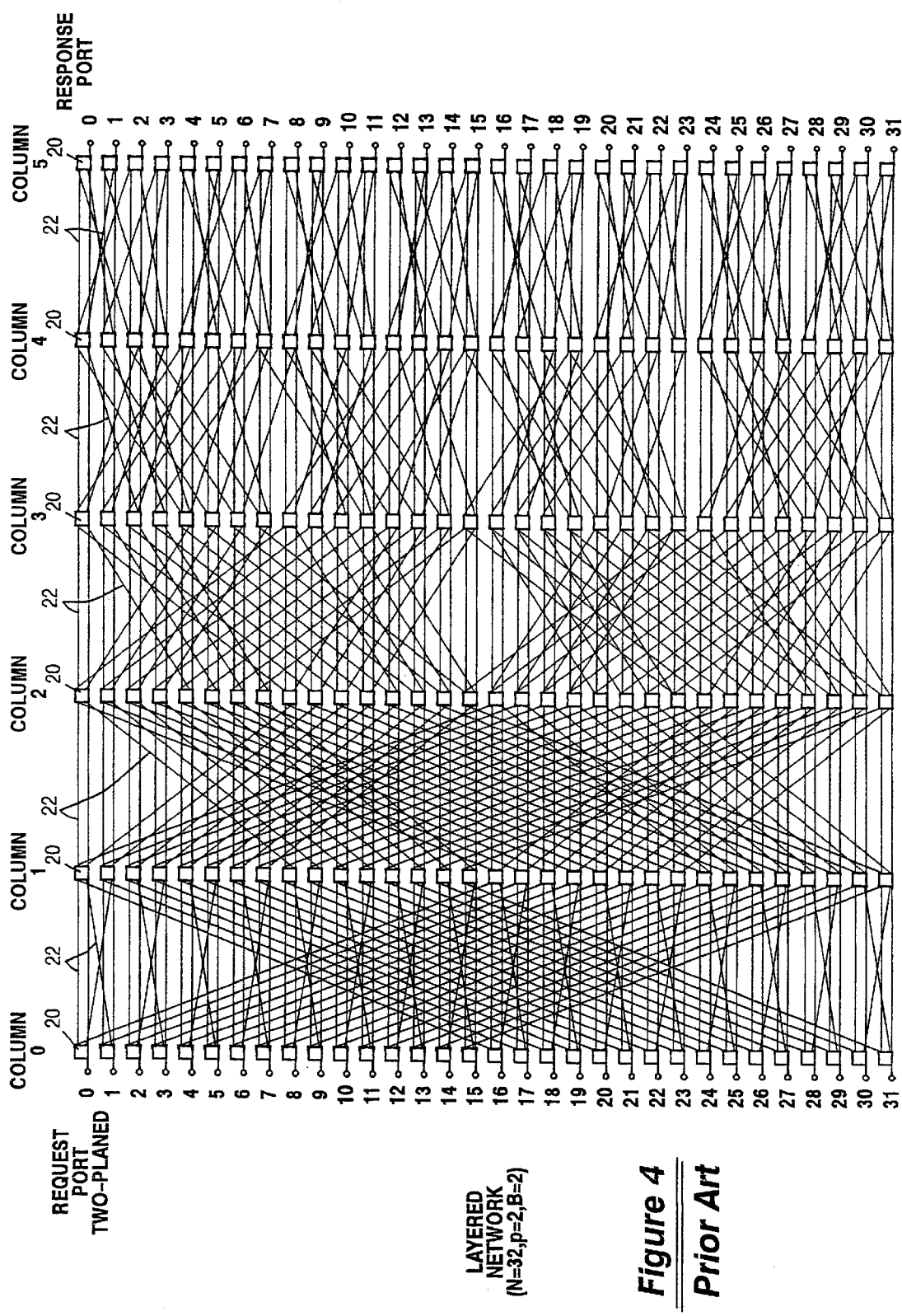
FIG. 4 is a block diagram of a prior art two-layered network.
Figure 5A:
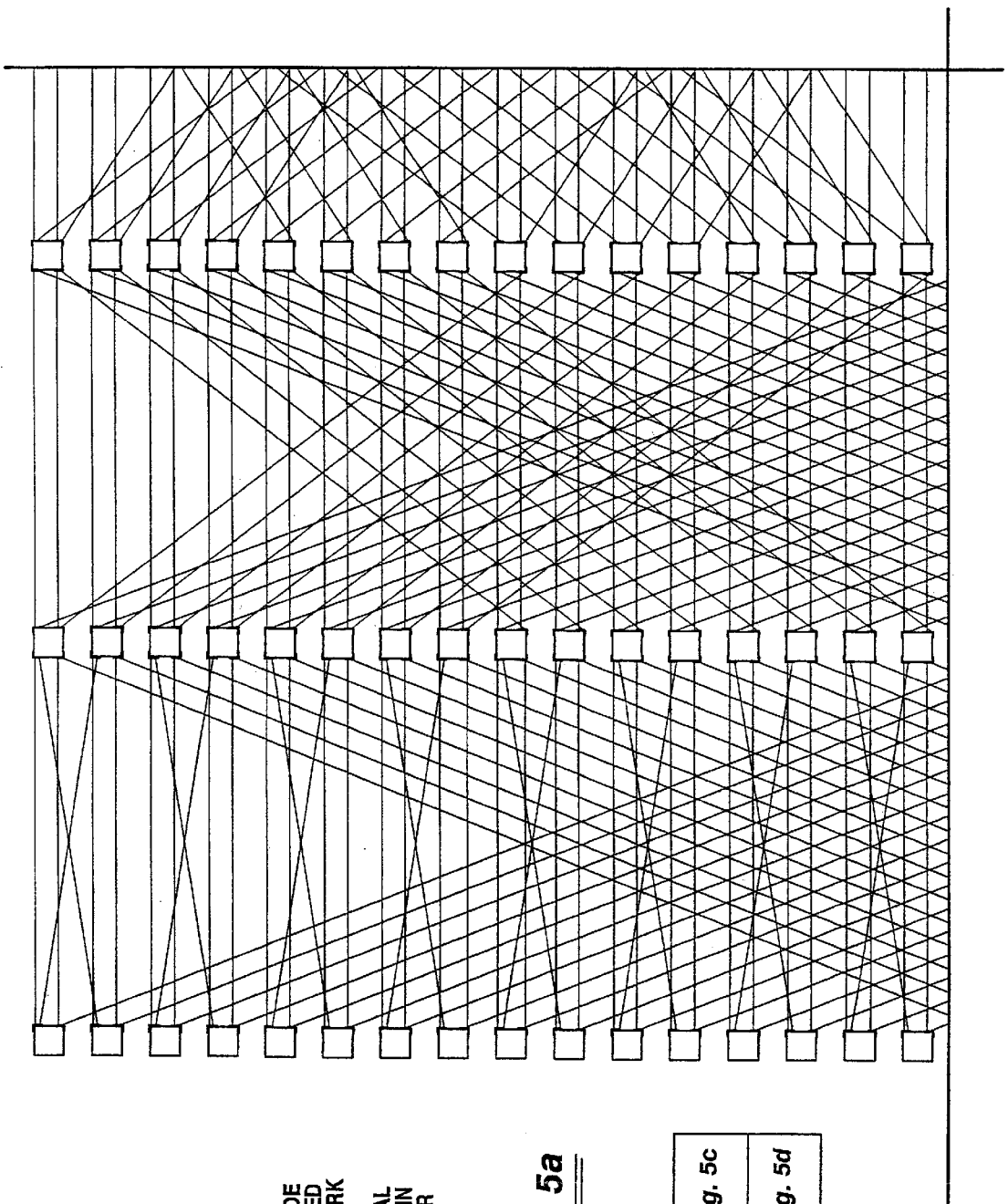
FIGS. 5a, 5b, 5c and 5d, arranged as shown in the associated block diagram, of a two-layered, 32-node network of the type shown in FIG. 4.
Figure 5B:
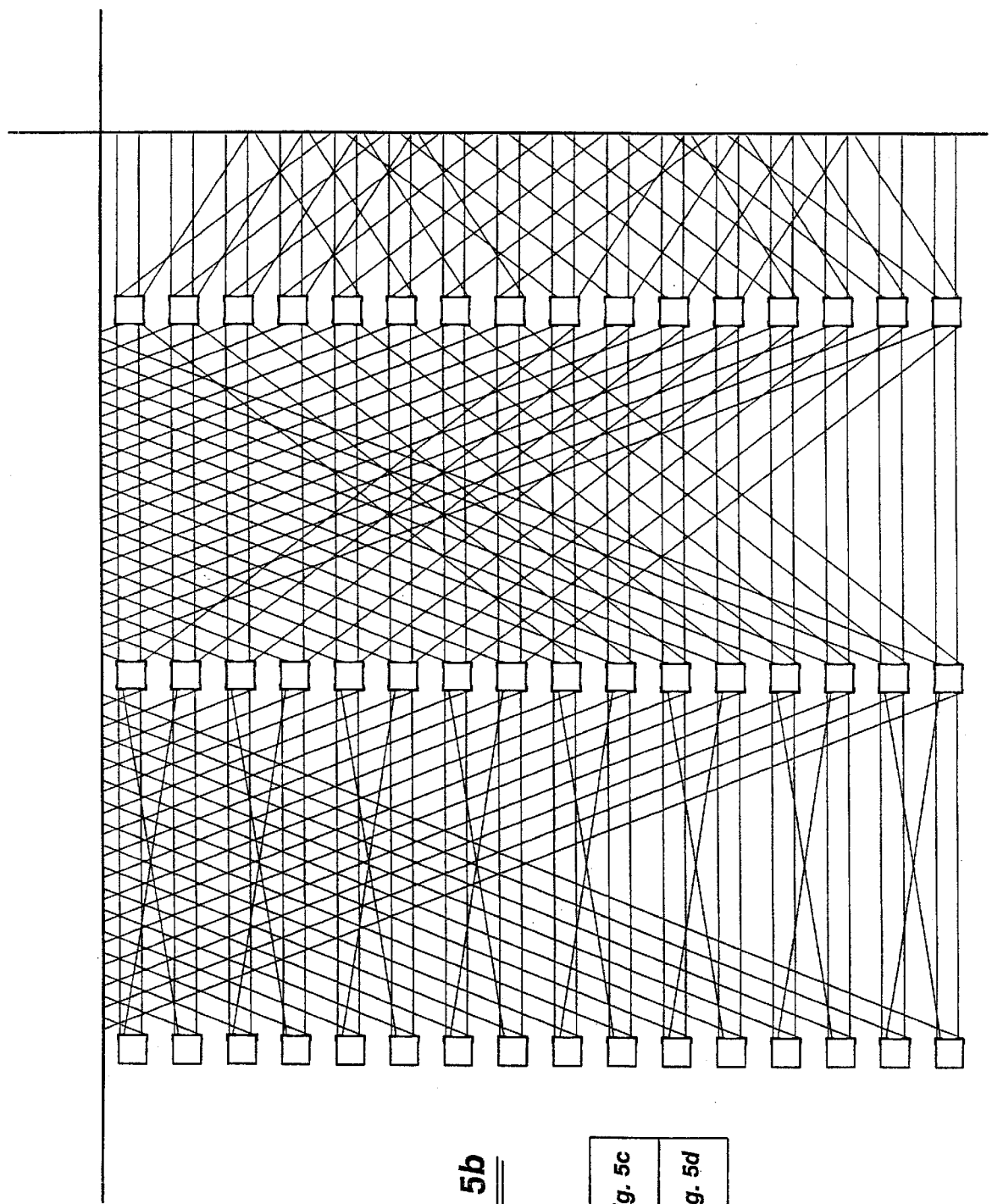
Figure 5C:
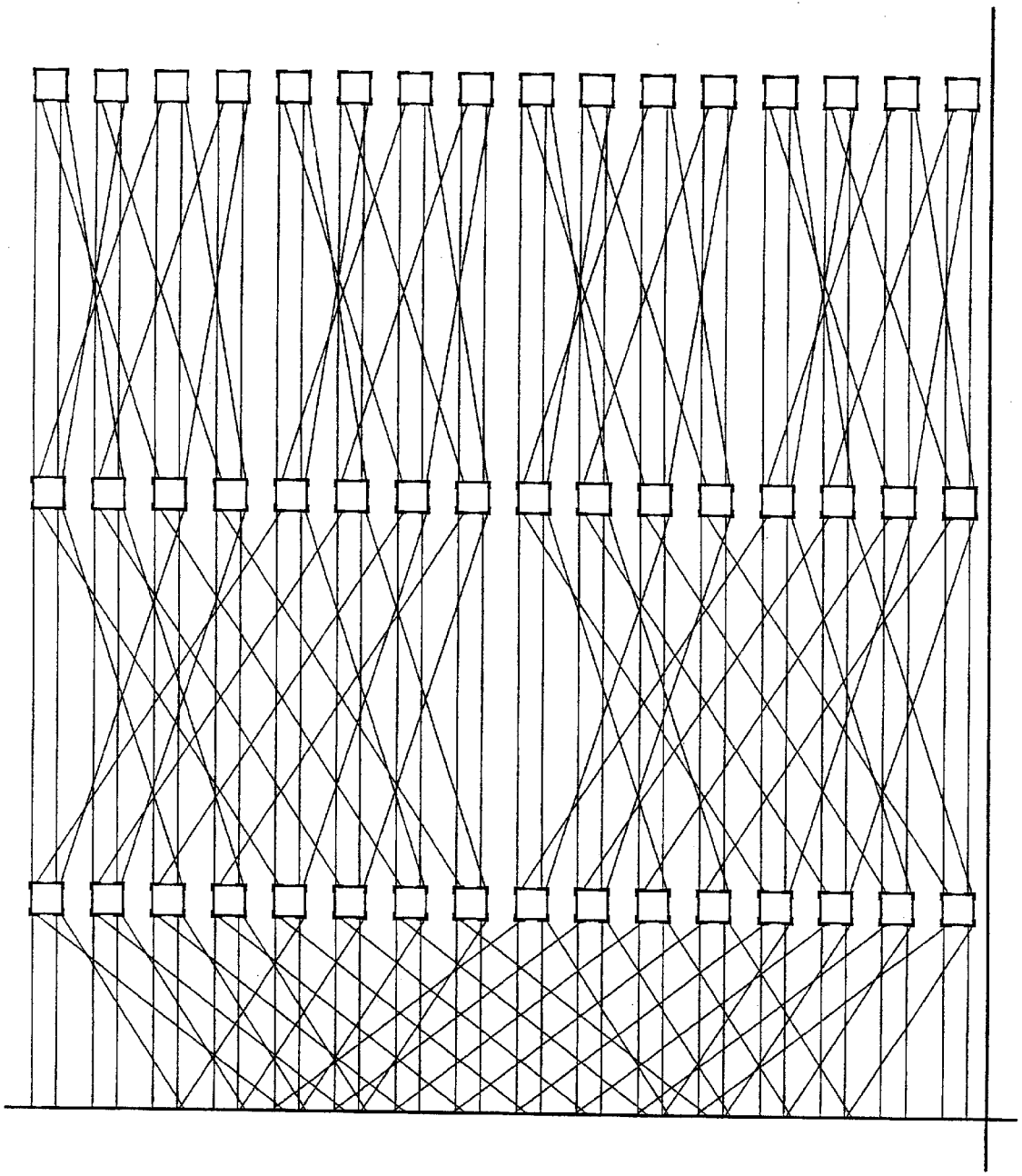
Figure 5D:
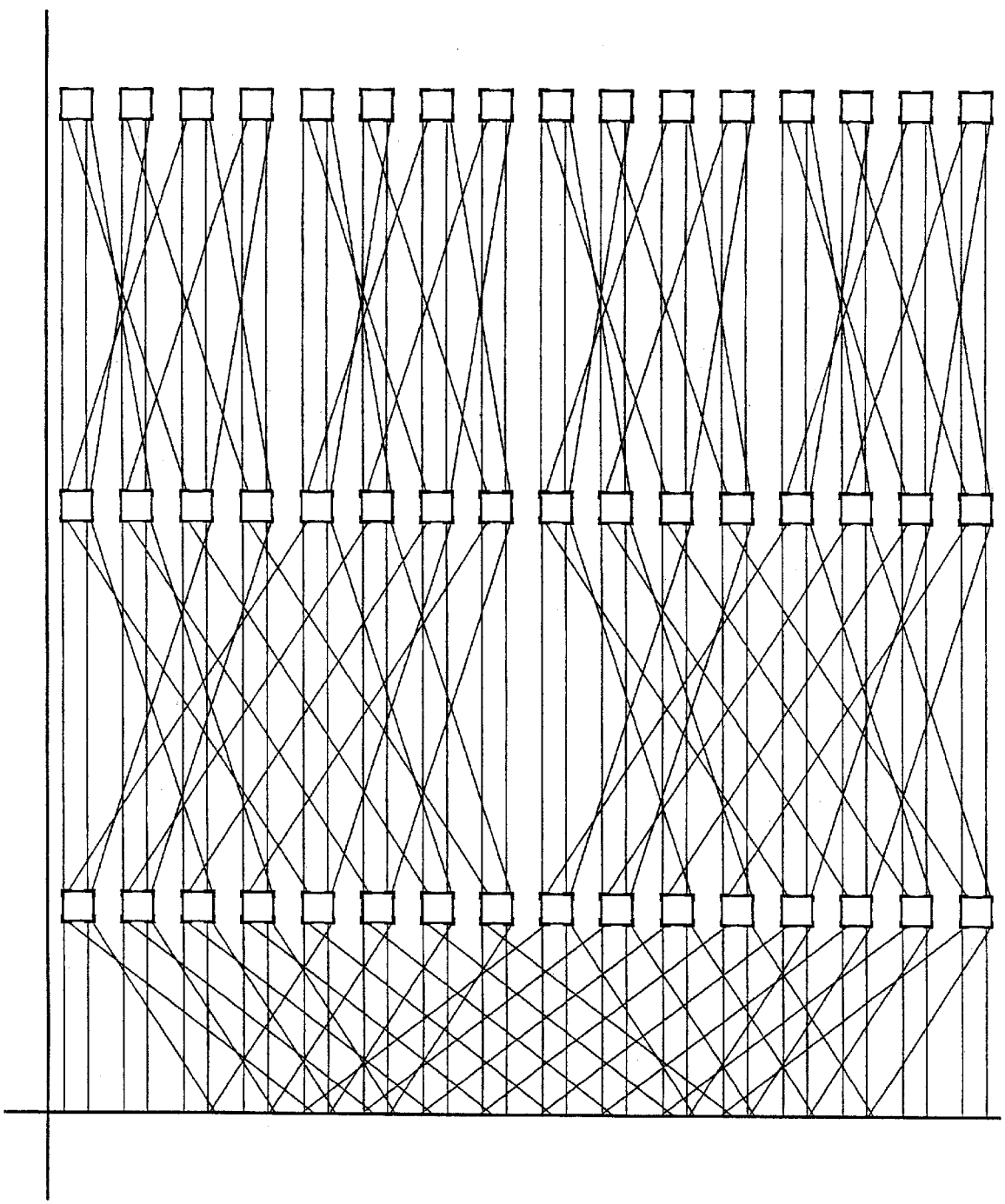

The description of the preferred embodiment of the invention employs U.S. Pat. No. 4,833,468, which is shown in FIG. 4, as a representative example to illustrate the manner in which the multi-stage switching networks of the present invention may be configured and constructed. Aside from being one of the types of networks to which the present invention may be applied, the wiring topology and operation of the network of U.S. Pat. No. 4,833,468 is not essential to the invention of this document. U.S. Pat. No. 4,833,468 illustrates one of the many wiring topologies to which this invention applies.

In FIG. 4 a two-planed layered network, implemented in accordance with U.S. Pat. No. 4,833,468, has six columns of switches, numbered 0–5, and 32 rows, numbered 0–31. At the input of each of the rows there is a numbered request port, and at the output of each of the rows there is a numbered response port. Point-to-point connections between the request port and the response port are made through the network through the interconnecting wire pattern, as is shown in FIG. 4. The signals that are directed from the request port are called "requests," and they travel through the network until they reach a device connected to a selected one of the response ports. The response port then sends a "response" signal containing requested data back through the network to the request port. The switches in the network are active switches, and switch settings are determined by using comparison of the requests with the request current location in the network. Each switch routes the request using only information that was contained in the request itself to provide a distributed routing without a centralized controller. The switch setting is remembered to route responses on the same paths as the associated request, but in the reverse direction.

In the layered networks of U.S. Pat. No. 4,833,468, a switch can route a signal to another switch in the next stage that has the same switch number except for a single binary digit. A "request" (packet) contains a binary number that identifies the desired response port. The switch compares the request's destination with bits in its own switch number, and if the bits compared are the same, the request is routed to a straight interconnection path between the switch-points. Otherwise, the request is routed to another switch through one of the "diagonal" connecting paths. This reduces by one the Hamming distance (i.e., the number of bits of the address that differ) between a packet's destination address and the row number of the switch-point it currently occupies. If the request reaches the switching output stage and the switch number exactly matches the request, the Hamming distance will be zero.

The connections between the output terminals of one column of switches and the input terminals of the next column of switches are interconnected in accordance with selected row address routing bits. The algorithm for implementing an embodiment of a layered network of the type described in U.S. Pat. No. 4,833,468 depends upon the input and output terminals that are associated with each of the switches and the numbered switches in a selected algorithm base.

The particular layered network shown in FIGS. 5*a*–5*d* is a two-planed layered network that has thirty-two rows and two planes and is an enlarged version of a network that is similar to that of FIG. 4. This means that the interconnection wires throughout the network from the output terminals of the switches of column 0 to the input terminals of the switches of column 5 have two straight paths and two diagonal paths for each of the switches of the network.

FIGS. 5*a*–5*d* shows that the longest wires of this network embodiment occur between the switches of columns 0 and 1 and between those of columns 1 and 2. The first step in implementing the present invention in networks, such as the one in FIGS. 5*a*–5*d* in which the longest interconnecting wires are not found in the middle of the network, is to conceptually or graphically "rotate" the columns of the network.

After column "rotation" it is seen that the interconnection pattern that existed in FIGS. 5*a*–5*d* between columns 4 and 5 now appears between columns 0 and 1. The interconnection pattern between the outputs of the switches of column 1 and the inputs of the switches of column 2 is then identical to the prior interconnection pattern between the outputs of the switches to the inputs of the switches of column 1 in FIGS. 5*a*–5*d*. Thus, it is seen that all of the interconnection patterns are moved to the right by column so that the interconnection pattern of FIGS. 5*a*–5*d* between the switches of columns 1 and 2 with the longest interconnection paths is now placed between the switches of columns 2 and 3 in the middle of the network of FIGS. 6*a*–6*d*.

The row address routing bits that are used to determine the wiring pattern between the switches of the layered network of FIGS. 6*a*–6*d* are shown below the wires and between the columns of the switches. For example, between columns 0 and 1 row routing address bits 0,1 are used. Between columns 1 and 2 the row routing address bits 0,4 are used. Between columns 2 and 3 the row address bits 4, 3 are employed. Between columns 3 and 4 the row address bits 3,2 are used. Between column 4 and 5, the row address bits 2,1 are used.

In the network of FIGS. 6*a*–6*d* each switch has four outputs and four inputs. The switches are numbered in hexadecimal as a compact representation of binary numbers. Two straight paths are connected between switches in adjacent columns that have the same row numbers. The diagonal paths are determined by a particular bit in the row number of the originating switch to find the row number of the destination switch.

For example, wiring the diagonal path from the switch in row 0, column 0 (upper left-hand switch in FIGS. 6*a*–6*d*) to the switch in row 2, column 1 is determined by row address bit 1 (i.e., the switch in column 0, row 0 is connected to the switch in column 1 row (0+2)=row 2). Wiring the other diagonal path is determined by bit 0 to connect to the switch in column 1, row (0+2⁰)=row 1. (Binary non-negative integer numbers have their bits from right to left starting with zero.) Similarly, the switch in column 3 row 7 is connected to switches in column 4, row 7 (two straight paths), row (7+2³)=row 5, and row (7−2²)=row 3.

The interconnection pattern of FIGS. 6a–6d is now conceptually or graphically folded at the middle of the network along the dotted line between the switch columns 2 and 3. Performing this operation results in two overlapping layers of switches. The switches of columns 0–2 may be thought of as forming an upper layer and those of columns 3–5 as forming a lower layer such that after folding switches in overlapping columns will be located on the same panel. Switches to the left of the dotted line on FIGS. 6a and 6c before folding are then representative of switches on the upper layer that send requests "away" from the processors connected to the left-hand, input side, and switches to the right of dotted fold line on FIGS. 6a and 6b then represent switches on the lower level that send requests "back" towards the processors connected to the right-hand, output side of the structure. In other words, all of the switches of columns 0–2 to the left of the dotted line will lie in one layer directly over the switches of columns 3–5 to the right of the dotted line.

Folding solves the network end-around problem since it puts the longest wires on the new "top plane." Generally a processor needs to connect to both sides of the network. This is the case when a unidirectional SCI ring protocol SCI is emulated. If the processors are plugged into one side of the network, then channels emerging from the opposite side of the network previously needed to loop the end around in a most inelegant manner. In foursquare geometry, data packets traverse half the network "away" from the processors, and the other half "back." Because of this two columns of switch-points must reside on the same tile, and four different routing grids are needed for flex connections between panels. Routing grids can route in a first direction (e.g., north/south) or in a second normal direction (e.g., east/west). Thus, the wires between switch terminals whose row numbers differ by a single bit are independent of whatever direction a bit is wired in the other routing grid. Two columns of wiring route two address bits each, using four routing grids.

Figure 6A:
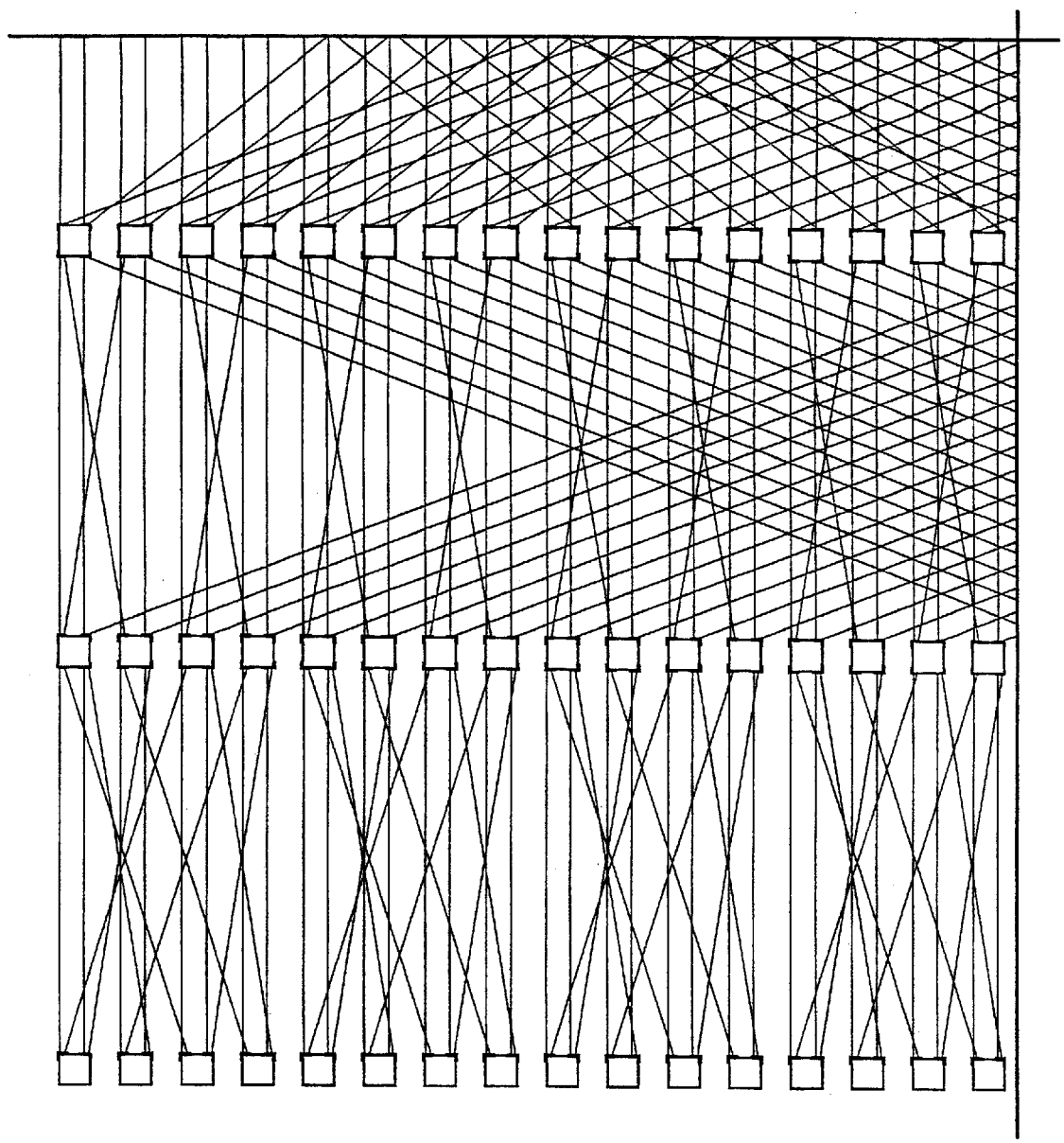
FIGS. 6, 6b, 6c and 6d, arranged as shown in the associated block diagram, of the two-layered, 32-node network of FIGS. 5a–5d in which the column rotation of the present invention has been applied.
Figure 6B:
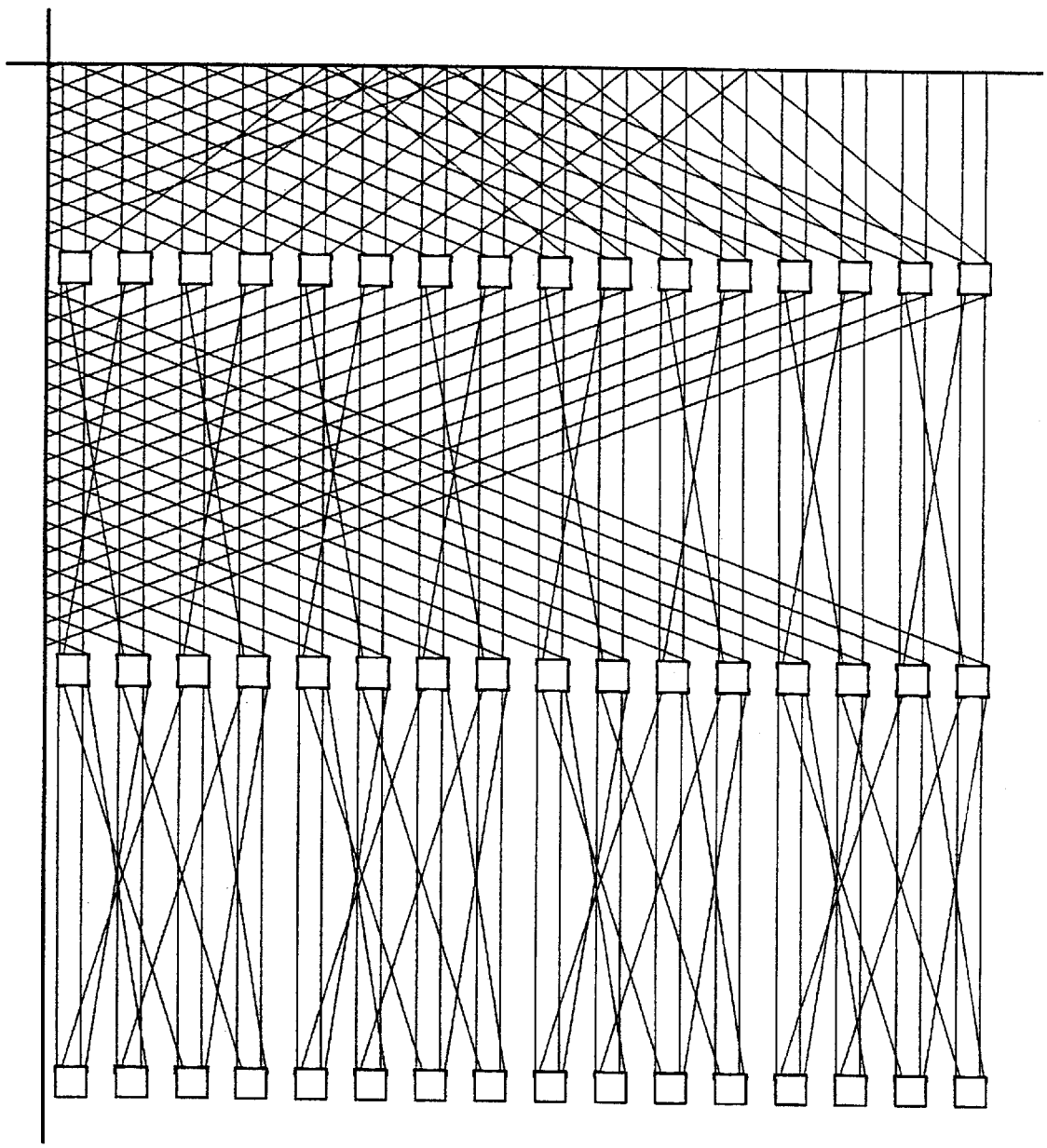
Figure 6C:
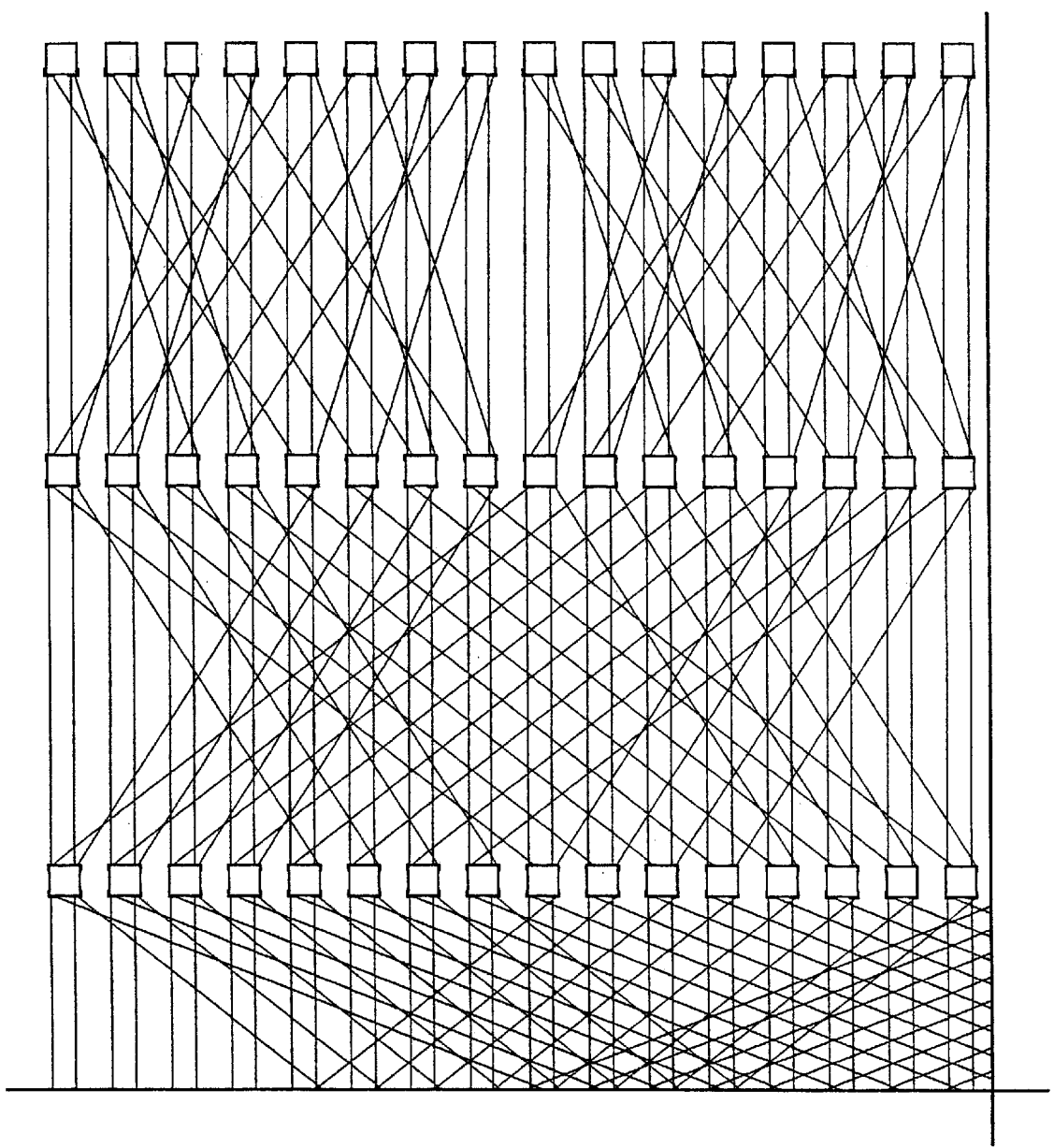
Figure 6D:
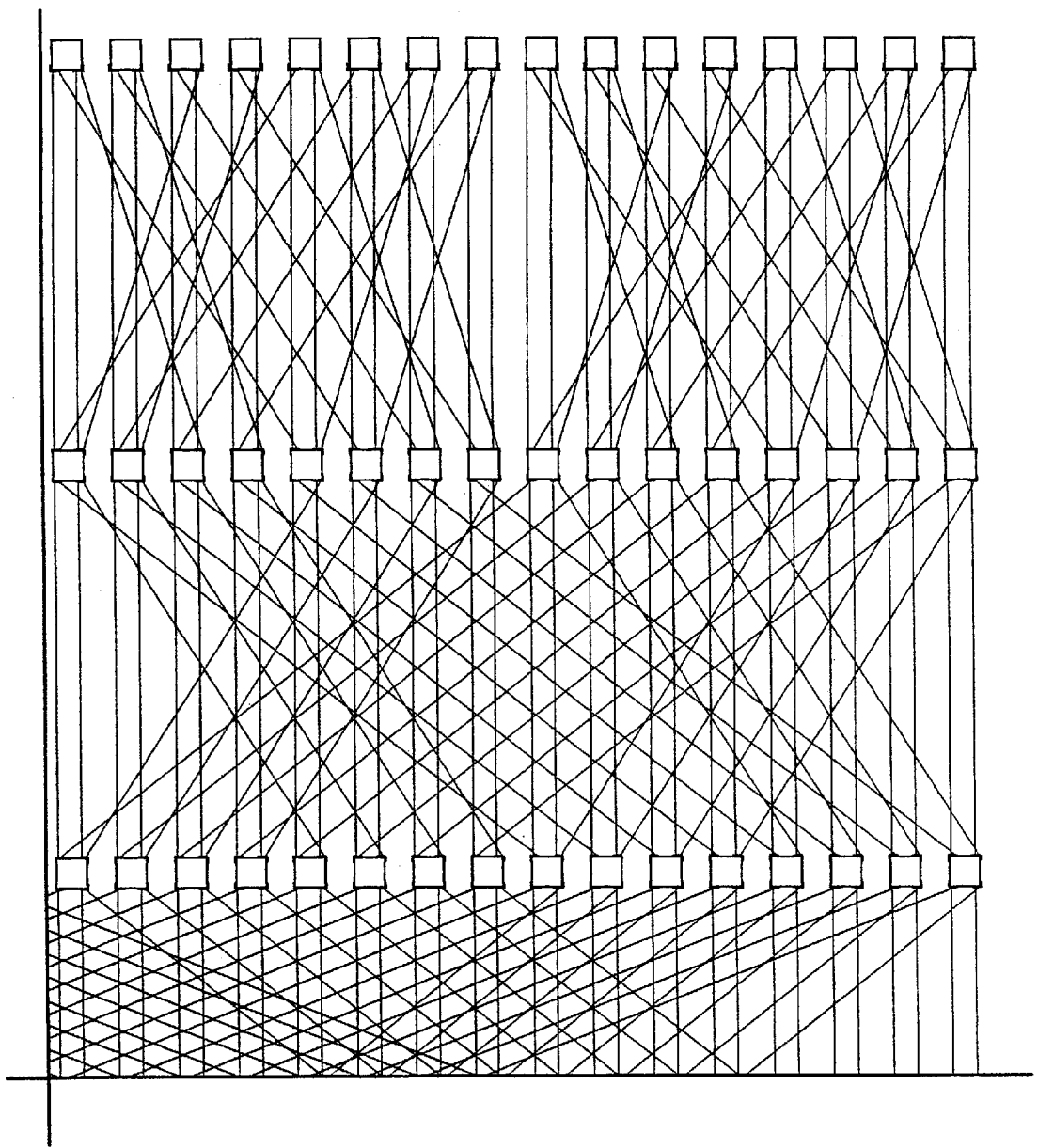

The switches in both the upper half-network and the lower half-network are next grouped into groups A, B, C, and D. Group A, as shown in FIGS. 6a, 6b, consists of the switches numbered 0–7. Group B, shown in FIGS. 6a, 6b, consists of the switches numbered 8-F in hexadecimal. Group C, shown in FIGS. 6c, 6d, consists of the switches numbered 10–17. Group D, shown in FIGS. 6c and 6d, consists of the switches numbered 18-F. The folded configuration of FIGS. 6a–6d is now "squared" or translated to a scalable implementation in which the switches are laid out in a square such that every switch whose row number differs by a single bit lie up, down, left, or right of each other.

Figure 7:
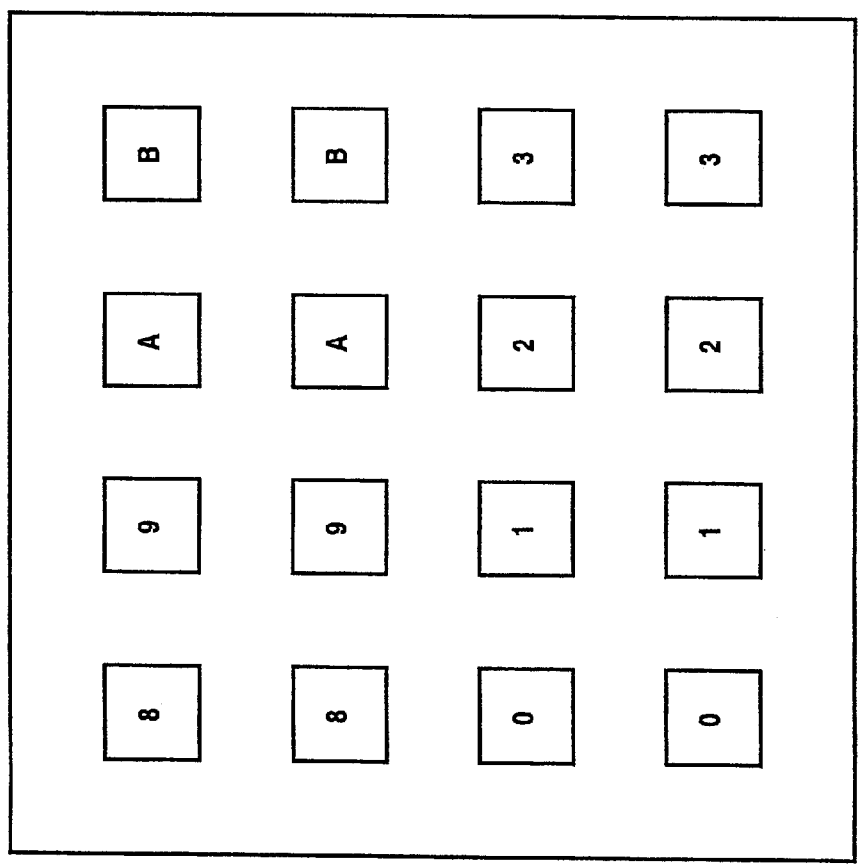
FIG. 7 is a printed circuit board layout of switches which shows how the switches of two columns, such as the columns 0,5 or the columns 1,4, or the columns 2,3, may be arranged and how the switches corresponding to these paired columns may be numbered.
Figure 8:
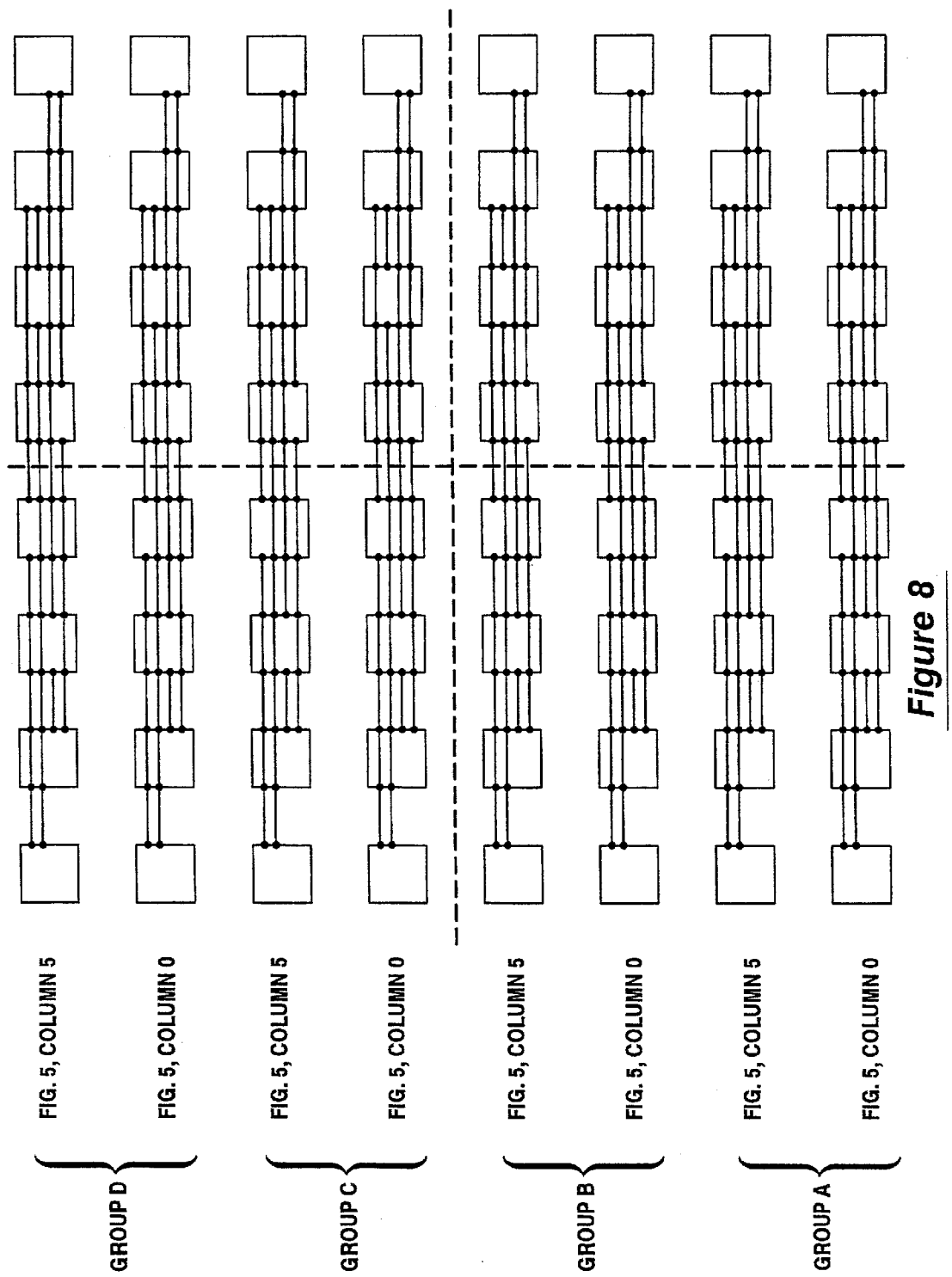
FIGS. 8, 9 and 10 are cards from the implementations of FIGS. 6a–6d so that the switches on each of these cards are arranged in groups A, B, C and D in which FIG. 8 applies to the switches of columns 0 and 5.
Figure 9:
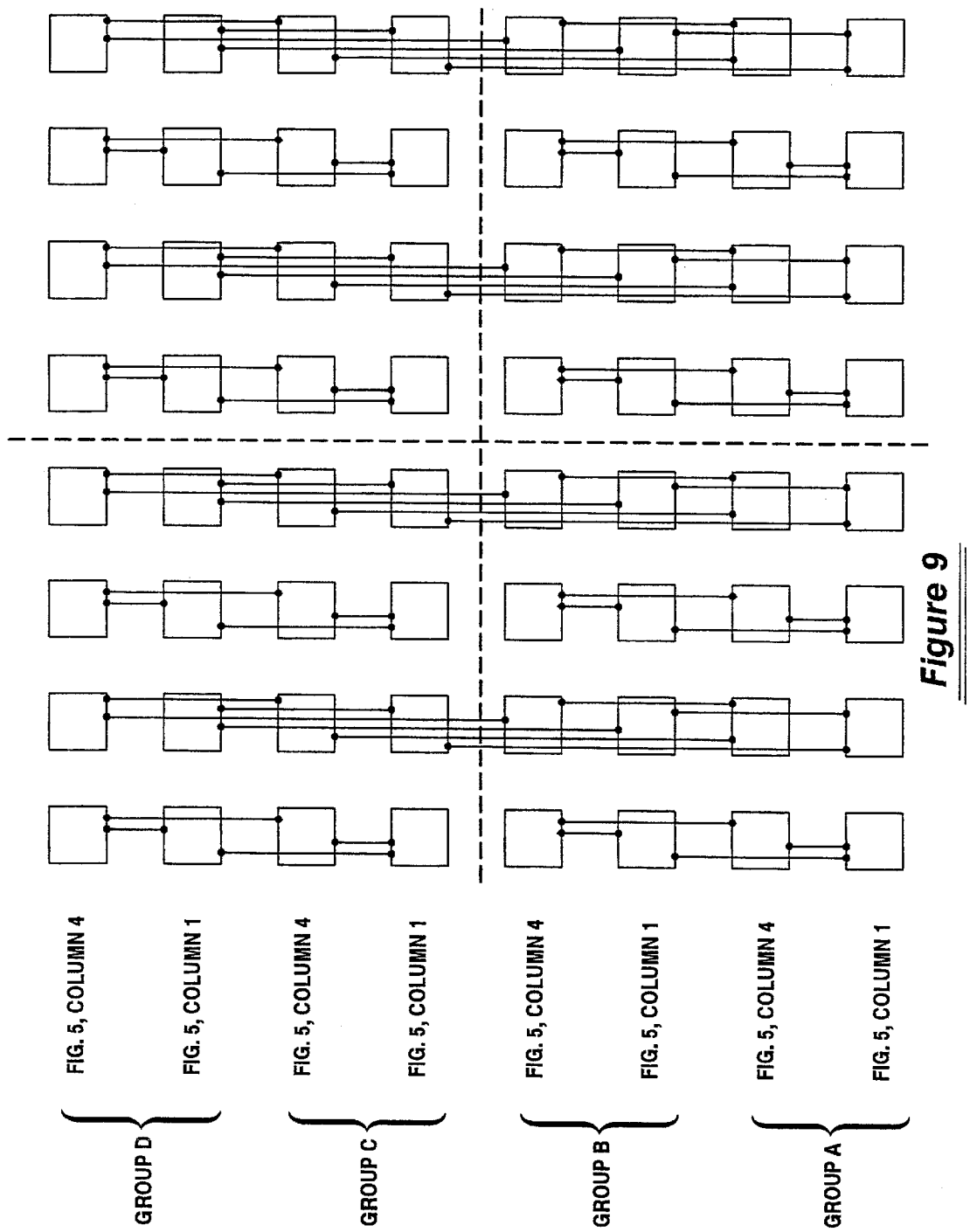
Figure 10:
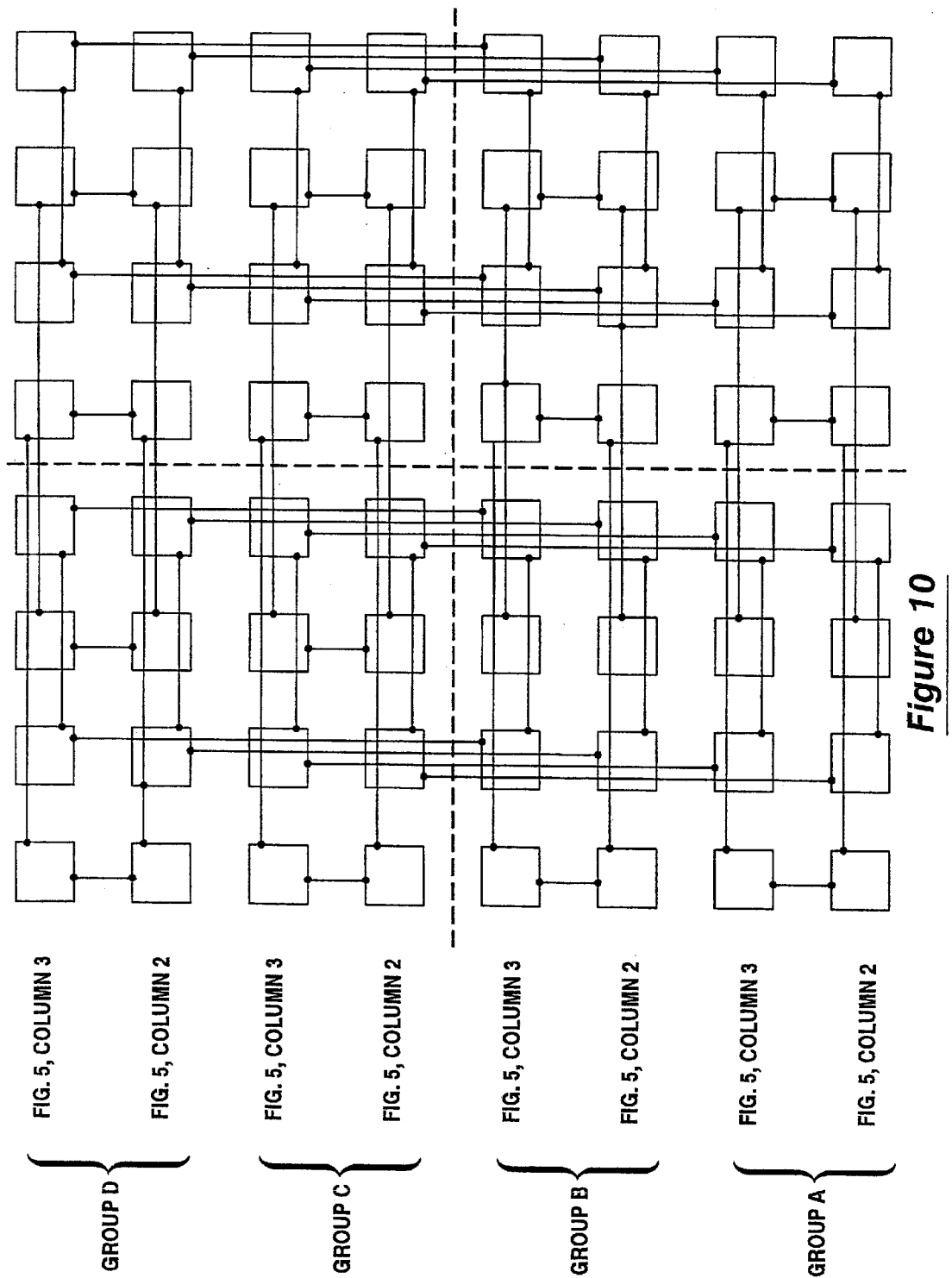

Reference is now made to FIG. 7, which shows the hexadecimal numbering pattern for the basic 4×4 switch building block, which applies to the switches of FIGS. 6a–6d, and consequently to FIGS. 8, 9 and 10. This numbering pattern applies to pairs of columns 5,0 and 4,1 and 3,2, respectively, of FIGS. 6a–6d. FIGS. 8, 9 and 10 contain switches that form the same interconnection pattern as that shown in FIGS. 6a–6d.

The panels used to implement networks of FIGS. 6a–6d in a sandwiched rectangular or square configuration of panels is illustrated in FIGS. 8, 9 and 10 and is dependent on the selected size of the basic network panel. For example, the panels of FIGS. 8, 9 and 10 contain 8 ranks and 8 files of switches of building block group of switches, such as shown in FIG. 7. The words "rank" and "file" are used instead of "row" and "column" to distinguish the physical position of switch chips from their corresponding logical positions. Other initial building-block panels may contain any number of switches from 16 up to any even power of two. Although 256-switch building-block panels are possible, they would likely be more expensive than 4 combined 64-switch panels.

The panels of FIGS. 8, 9 and 10 each show all of the switches of two representative columns of switches from the interconnection pattern illustrated in FIGS. 6a–6d. The specific columns of switches contained on each of the panels of FIGS. 8, 9 and 10 are labeled on these figures. The switches of each file on a given panel of FIGS. 8, 9 and 10 are aligned into interleaved alternating ranks, which are labeled at the left-hand sides of these figures. For example, the bottom rank of switches in FIG. 8 corresponds to those that are found in column 0 group A of FIGS. 6a–6d. The switches in the next rank above this rank correspond to those of column 5 of group A. The other ranks appear in an alternating pattern from the bottom to top as column 0 group B, column 5 group B, column 0 group C, column 5 group C, column 0 group D and column 5 group D.

The second panel of switches shown in FIG. 8 that are positioned above the panel of switches shown in FIG. 8 consists of alternating ranks of switches from columns 1 and 4, which are arranged in the same alternating group pattern as that of FIG. 8. The third, or top panel, of switches, shown in FIG. 9, contains an alternating pattern of switches from columns 2 and 3.

Wiring must now be made between switches in each of the panels to implement the network of FIGS. 6a–6d. For example, interconnection wiring patterns between the switches of column 0 in the lower level panel of FIG. 8 must be made to switches in column 1 of the intermediate panel of FIG. 9 to preserve the wiring pattern of FIGS. 6a–6d. FIGS. 8, 9 and 10 show the wiring pattern between switches on different panels. The wiring shown by lines with black dots at the ends do not indicate a connection between switches of the same panel or figure. On each figure one black dot indicates that a wire is connected to a switch on the panel represented in that figure, while the black dot on the other end of the wire indicates that a connection is made to a switch either above or below the switches shown in the figure. All interconnection wires are shown by straight lines in all figures. The straight paths always route straight up and are therefore not shown. For example, interconnection is made in a vertical manner from the switches of the lower panel of FIG. 8 to switches on the intermediate panel of FIG. 8. In this manner, interconnections are made between switches of column 1 of the intermediate panel of FIG. 8 to switches of column 2 of the top panel of FIG. 9, between switches in columns 3 of the top panel and switches in column 4 of the intermediate panel and between switches in column 4 of the middle panel to switches in column 5 of the top panel.

The desirability of rotating the columns of switches can now be seen since the top layer of switches will consist of switches from columns 2 and 3 of FIGS. 6a–6d. These connections are the longest connecting paths and they may be made on the plane itself without through-hole connections between panels.

In FIGS. 8 and 9 an interconnection wire has a connection at the output terminal of a switch of a column that has a number that is one less than the number of the column that has an input terminal to which the wire is connected and is located directly above or below such switch. FIG. 10 shows the interconnection path that provides connections between switches in the top panel of FIG. 10 to switches in the intermediate panel 9. By reference to FIGS. 6–10, all of the correct interconnections between all of the switches on FIGS. 8–10 can be directly traced. Only the diagonal connections of FIGS. 6a–6d are represented in FIGS. 8, 9 and 10, it being understood that the straight connections required to complete the wiring topology of FIGS. 6a–6d must also be made. These straight connections are not illustrated in FIGS. 8, 9 and 10 due to the added complexity that they would add to these figures without providing additional teaching.

Larger size networks may be implemented by constructing a network diagram for any size network and following the procedure described above. However, after a given size network is implemented, as illustrated by FIGS. 8, 9 and 10, further expansion may be achieved by the following described procedure in which the interconnection pattern between a number of the columns of switches nearest the input side and a number of the columns of switches nearest the output side may be retained. This is achieved because the addition of new columns of switches with this procedure will not require the assignment of new row address routing bits for these columns of switches with this procedure. The assignment of new row address bits, however, is required to complete the interconnection of the expanded size network for the new columns of switches.

Figure 11:
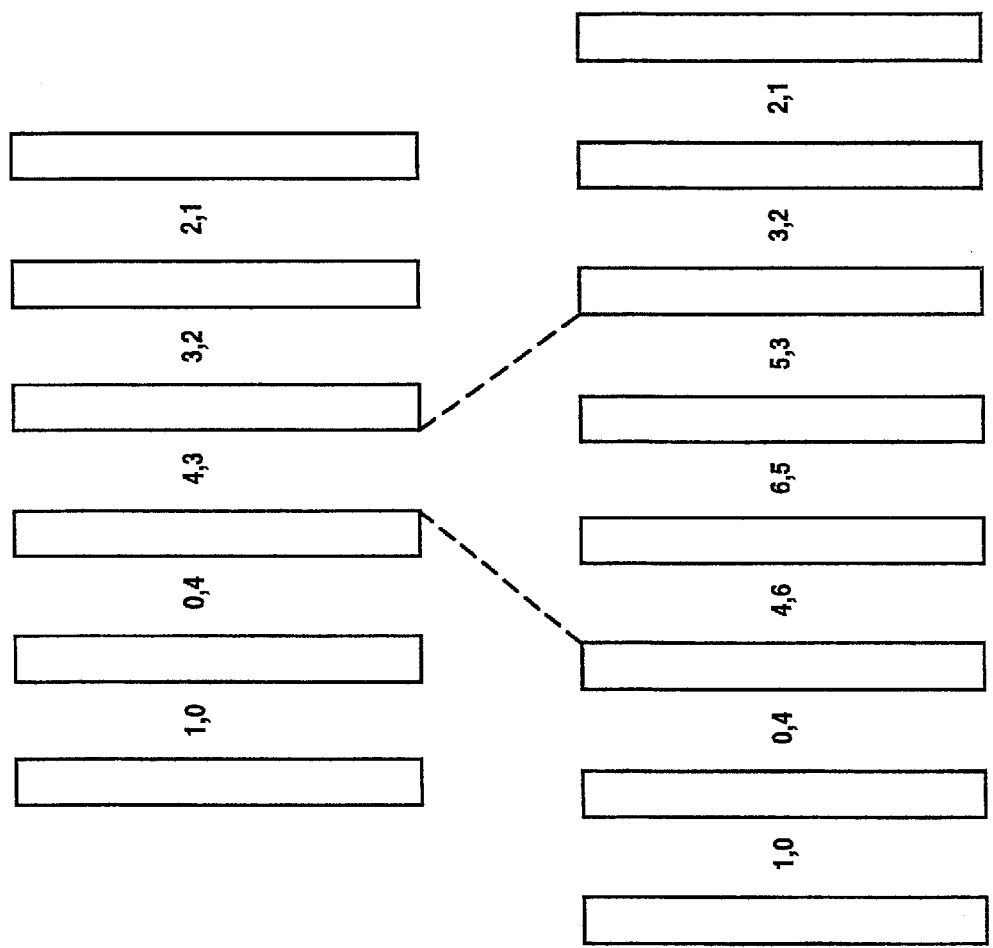
FIG. 11 is a diagram which illustrates in its upper portion the six columns of switches of the implementation of FIGS. 6a–6d, and in its lower portion an expanded network of eight columns of switches along with the row-routing address bits used by these networks.
Figure 13A:
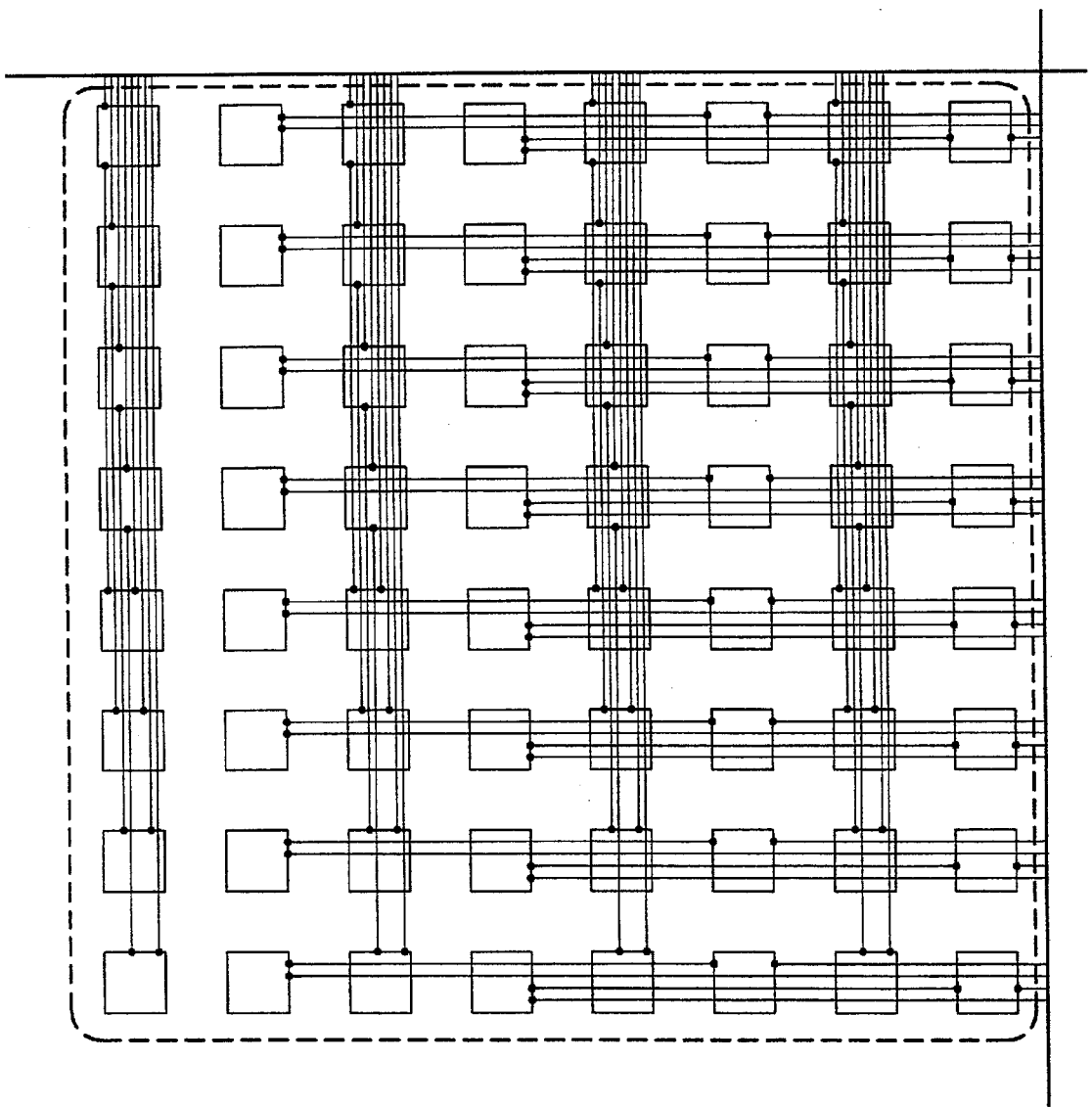
FIGS. 13a, 13b, 13c and 13d are wiring patterns for the four-card arrangement of FIGS 12a–12d, arranged as shown in the associated block diagram.
Figure 13B:
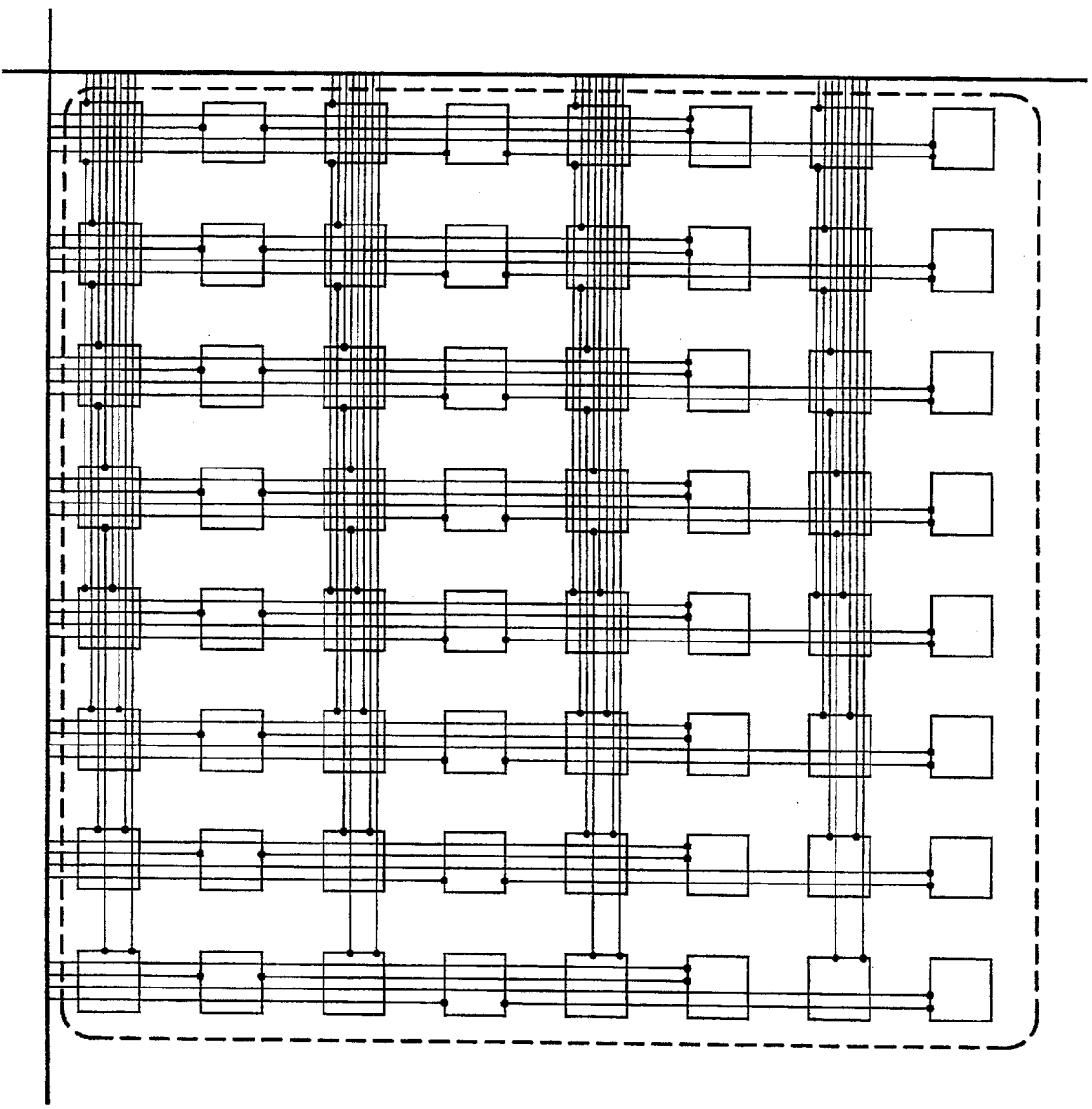
Figure 13C:
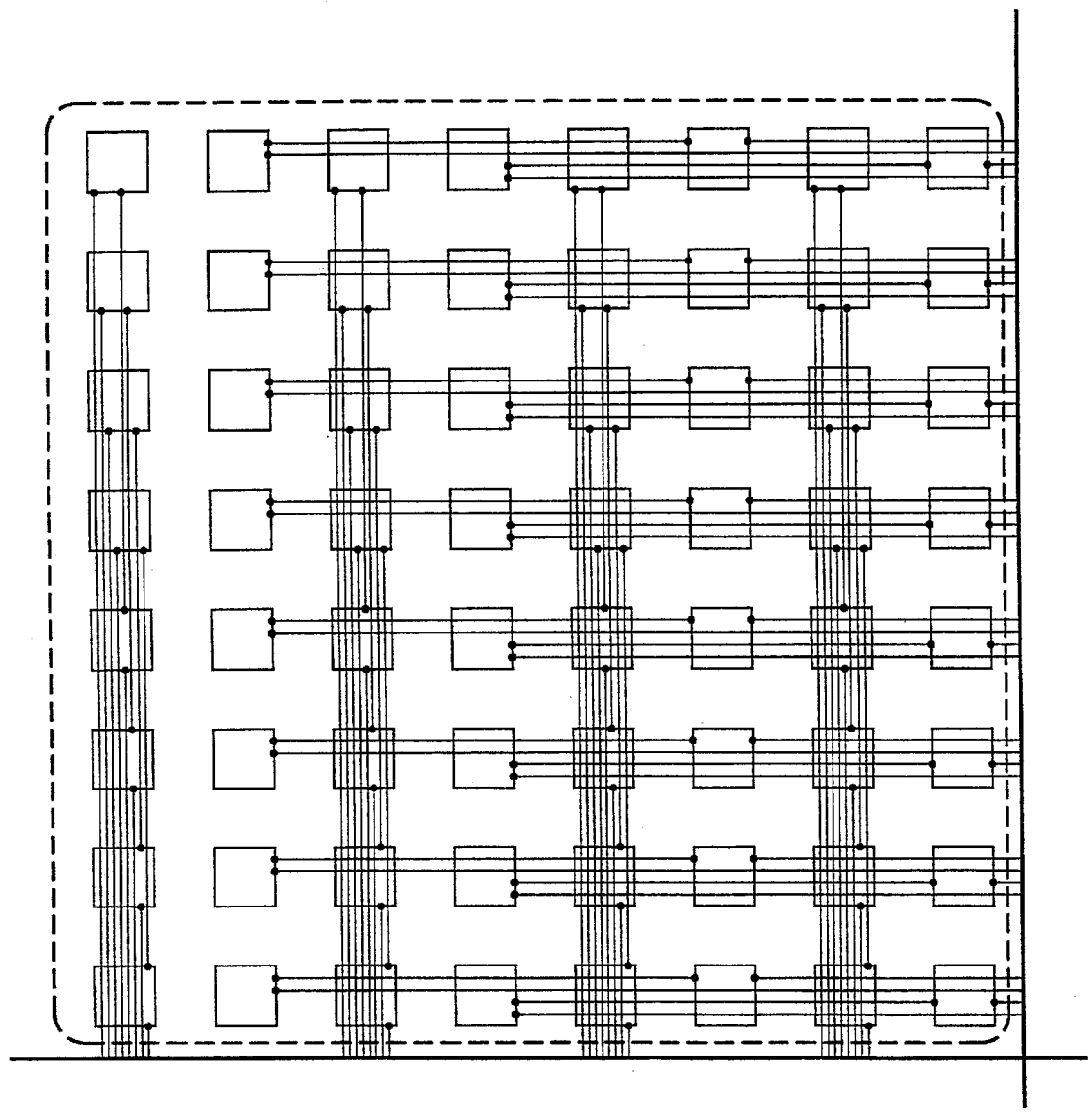
Figure 13D:
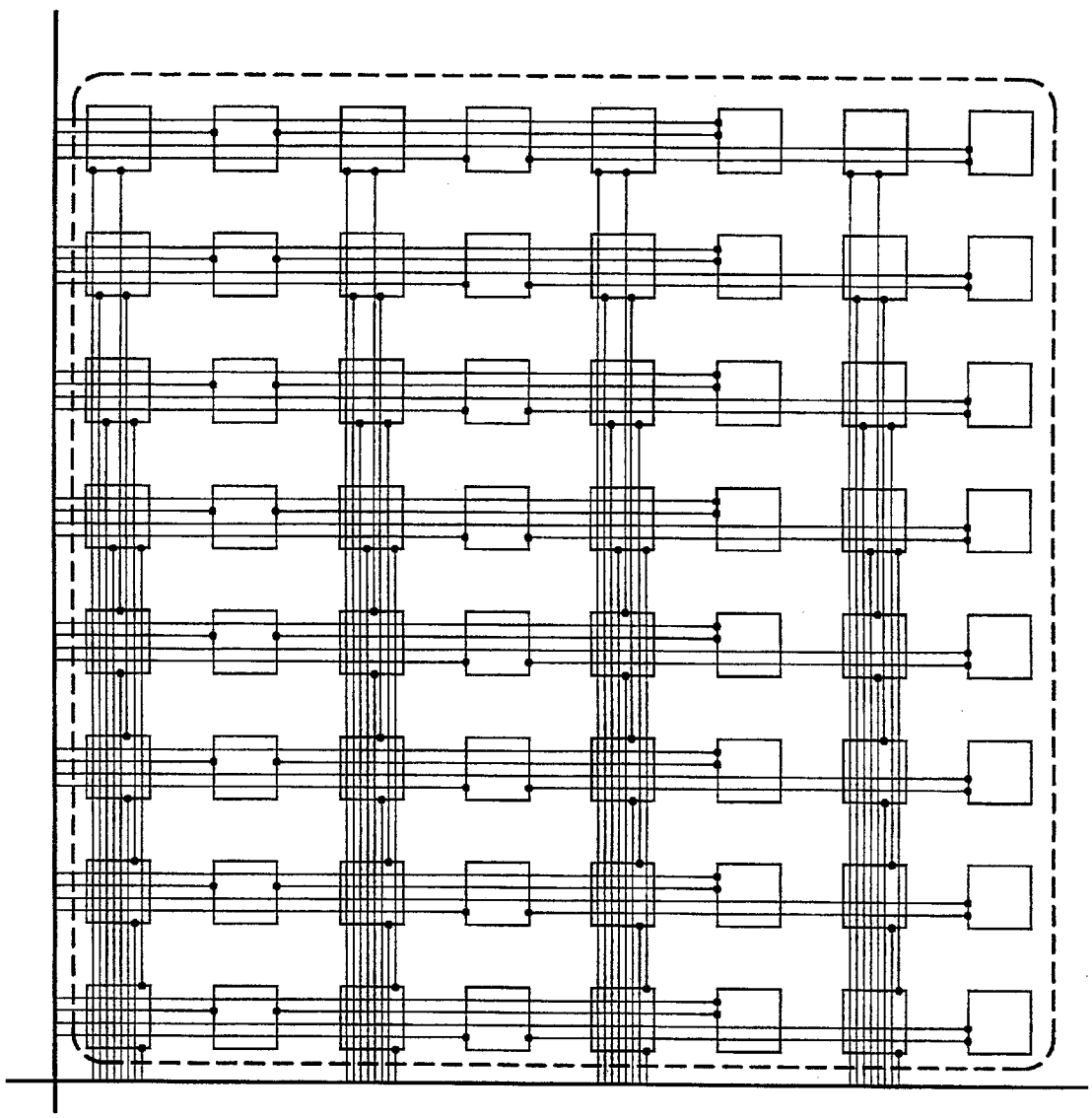

FIG. 11 is a diagrammatic representation of columns 0–5 of FIGS. 6a–6d. The wiring address bits that are used to form the wiring pattern of FIGS. 6a–6d are labeled between columns represented at the top of FIG. 11. The diagram at the bottom of FIG. 11 shows an expansion of the network in accordance with the invention to form a 128-node network with 8 columns of switches numbered 0–7. The topology, or interconnection pattern, of the network with two additional columns of switches that is represented by the lower portion of FIG. 11 requires three new combinations of row address routing bits 4,6 and 6,5 and 5,3; instead of the row address routing bits 4,3. New row routing address bit combination 4,6 is used to make diagonal interconnections between switches in columns 2,3, row routing address bit combination 6,5 is used to make interconnections between switches in columns 3 and 4, and row routing address bit combination 5,3 is used to make interconnections between switches in columns 4 and 5.

The particular combination of row routing address bits indicated by the bottom portion of FIG. 10 is not the only possible implementation, since many permutation combinations of row address routing bits can be employed within the scope of the present invention, providing the longest diagonal path wiring is maintained on the top panel of switches.

Expansion of the network to a 128-node network may be obtained by adding another switch panel to the panels of four, 32-node networks of FIGS. 6a–6d along with appropriate wiring. This is accomplished by utilizing four of the 8×8 switch-panel sandwiches previously disclosed to form a larger network, as shown in FIGS. 12a–12d. The expanded network, after adding another, four-times-larger panel, will then each have 256 switches in each four-times-larger panel.

FIGS. 12a–12d show a panel using four 8×8 sub-panels, which contain switches numbered as in FIG. 7, that are arranged into four sections which are labeled sector A, sector B, sector C, and sector D, respectively. Corresponding groups of four 8×8 sub-panels of the same type are also provided on the other three assembly layers. The switches in sector A are interconnected in accordance with the wiring bits indicated at the bottom of FIG. 11 of the 8-column expanded network. Thus, sector A will provide switches for rows 0–31 of the network. Sector B will provide switches for rows 32–63, section C connections for rows 63–95 and sector D switches for rows 96–127 of the 128-row network.

Since the row routing address bits remain the same for the 128-row embodiment, the interconnections between the lowermost two panels that provide interconnections for the row routing address bit combinations: (0,1), (4,0), (1,2), and (2,3). FIGS. 13a–13d show the wiring patterns necessary to interconnect switches on different panels. The wiring in FIGS. 13a–13d shows the wire paths that interconnect column 3 of the top panel to column 2 on the next lower panel and that interconnection column 4 of the top panel to column 5 of the next lower level for the four sector arrangement of FIGS. 12a–12d. The panels of FIGS. 8 and 9 are replicated four times, once within each sector. Because of the renumbering of the columns of the network at the bottom of FIG. 11, when the two new columns were added, column 6 of the expanded 128-row network corresponds to column 4 of the 132-row network, and column 7 of the expanded 128-row network corresponds to column 5 of the 32-row network.

The panel next to the top panel in the 128-row network will have a new interconnection routing pattern to route row address routing bits 4,6 and 5,3 and 6,5, as shown in FIG. 11, to provide interconnections between the switches of columns 2 and 3; and between the switches of columns 4 and 5; and between the switches of columns 3 and 4, respectively, of the 128-row network in a manner in accordance with the wiring methodology described for the 32-row network of FIGS. 6a–6d.

Figure 14A:
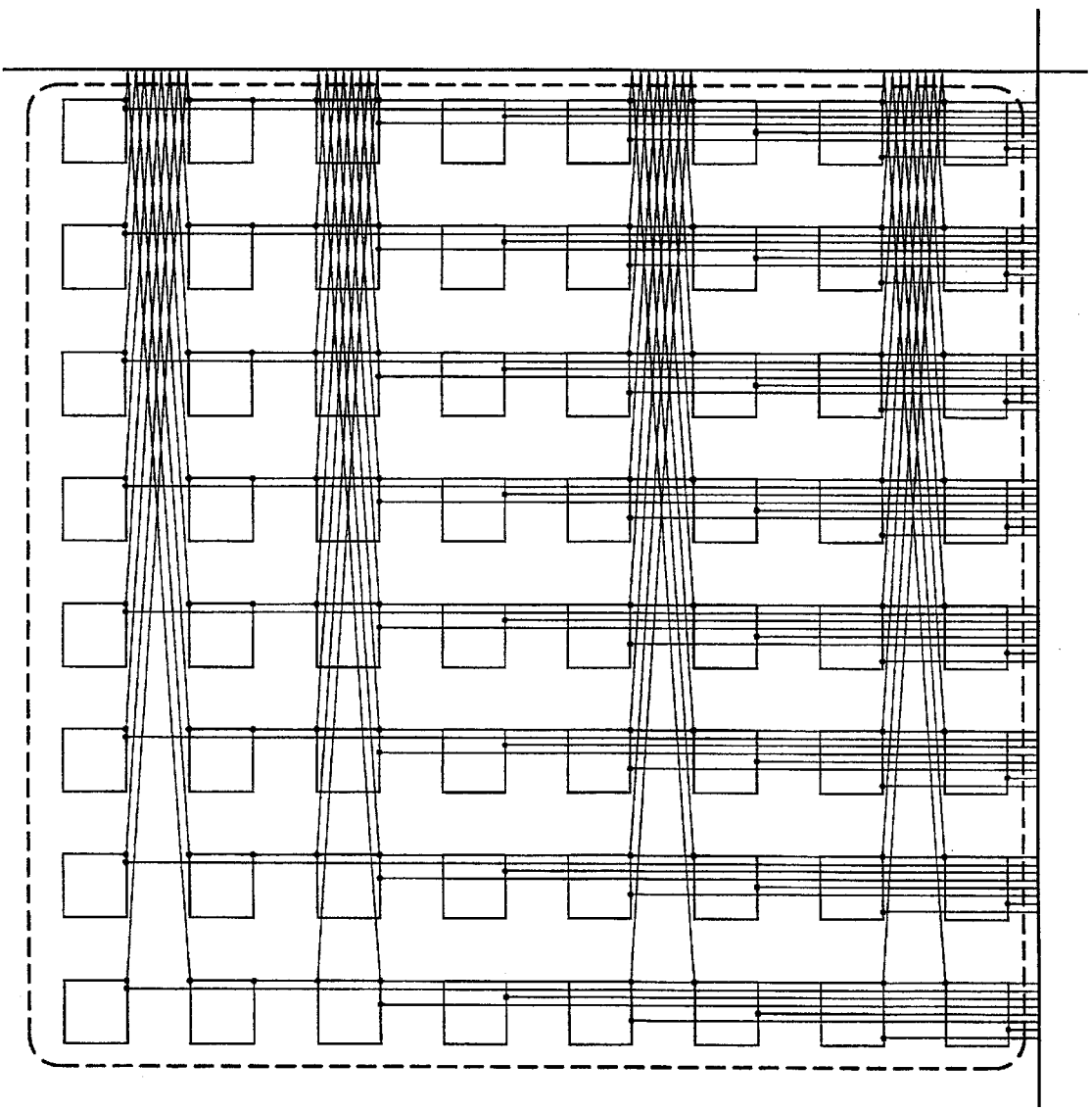
Figure 14B:
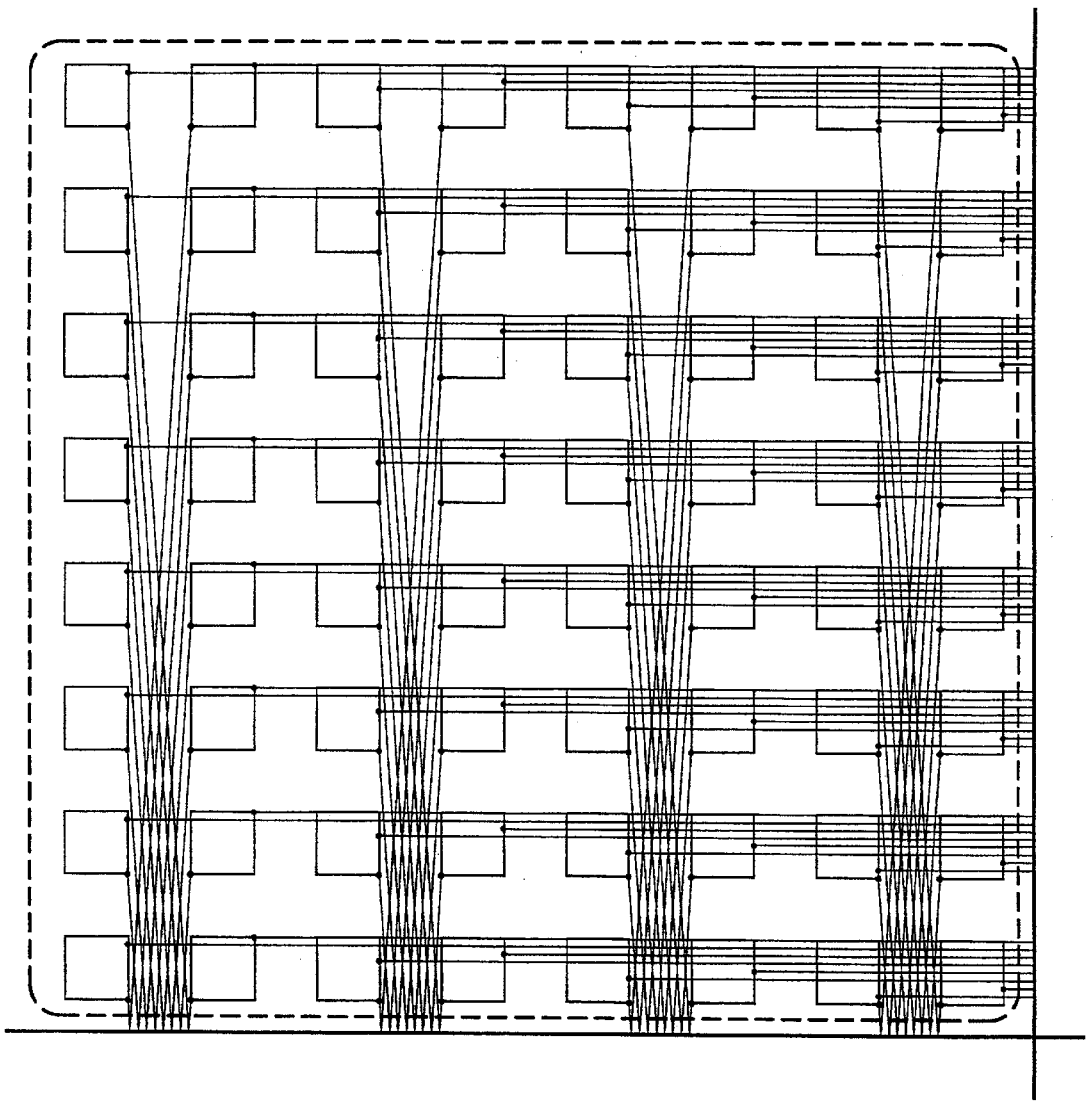
Figure 14C:
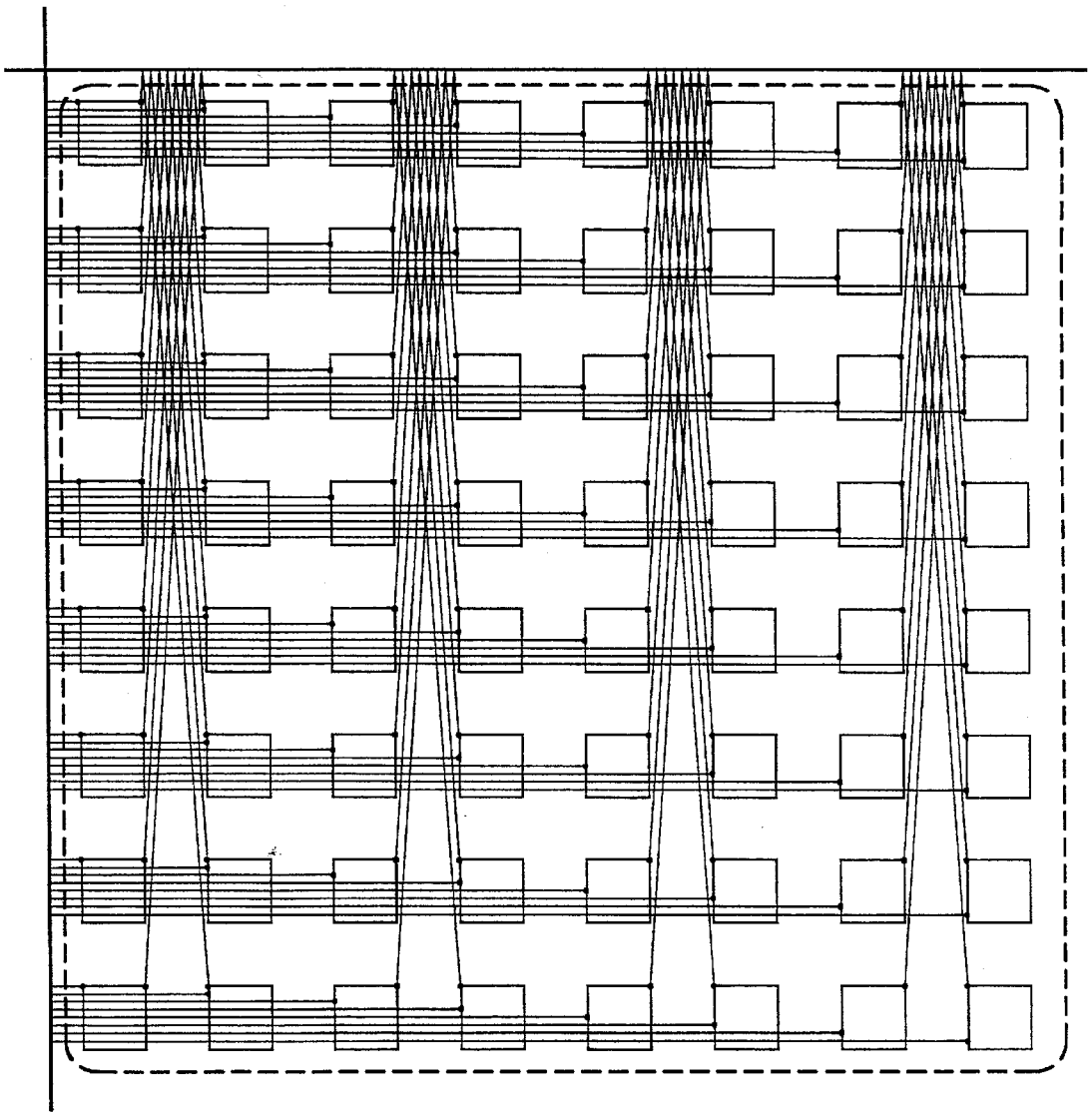
Figure 14D:
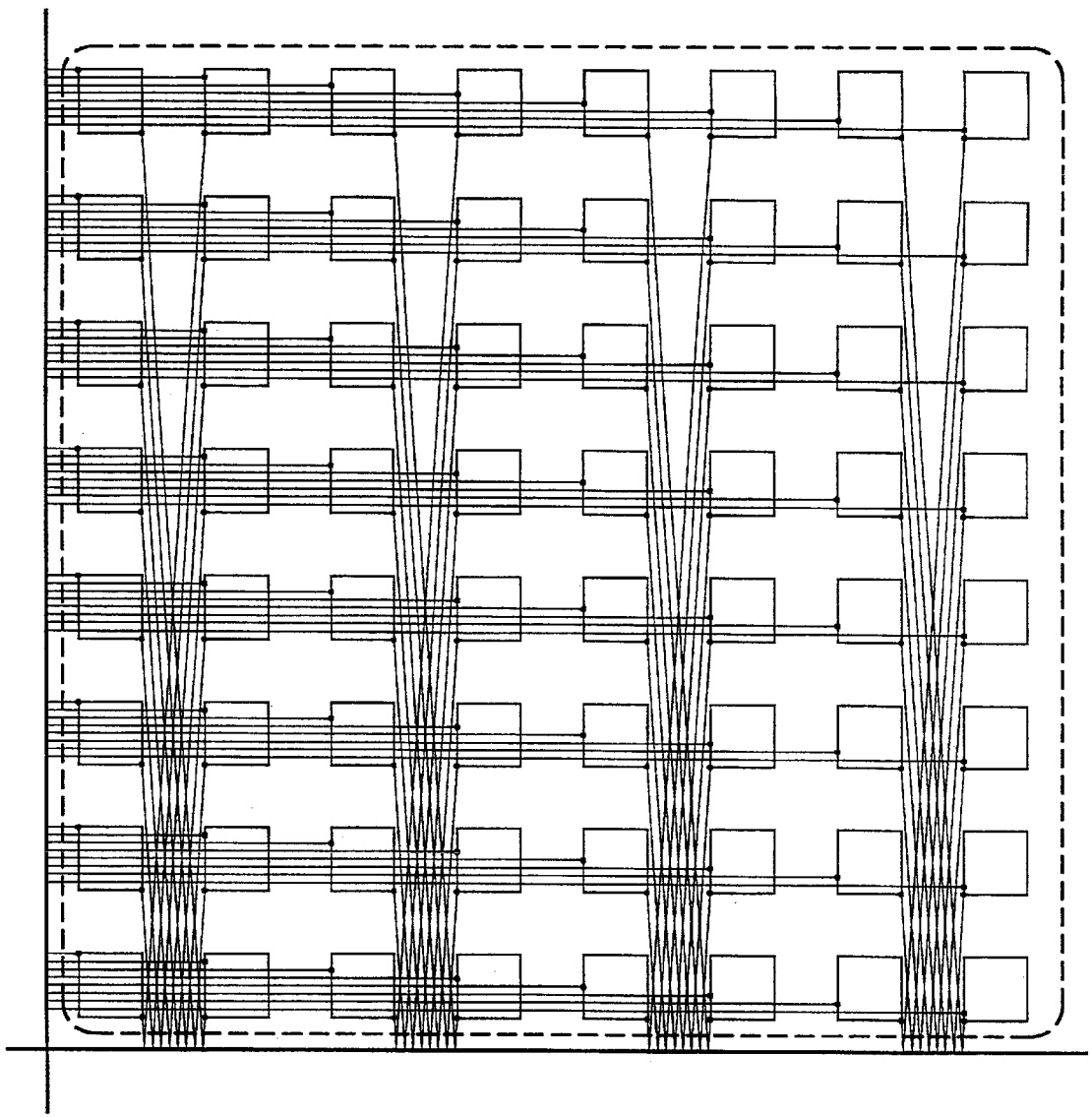

The top panel of the 128-row network of FIGS. 14a and 14b has the wiring pattern that is formed by the longest diagonal connections in the 128-row network that are routed by the row-routing address bits 6,5. As in the 32-row network, this wiring pattern is all in the same panel and all of the wiring paths shown in FIGS. 14a and 14b are represented by straight lines that run directly between sectors across these figures. These straight wiring paths, shown in FIGS. 14a and 14b, interconnect switches that have the same switch number in different sectors. For example, a switch in sector C that is numbered 19 is connected to a switch numbered 19 in sector A, and a switch that is numbered 1F in sector D is connected to a switch numbered 1F in sector B.

Figure 15:
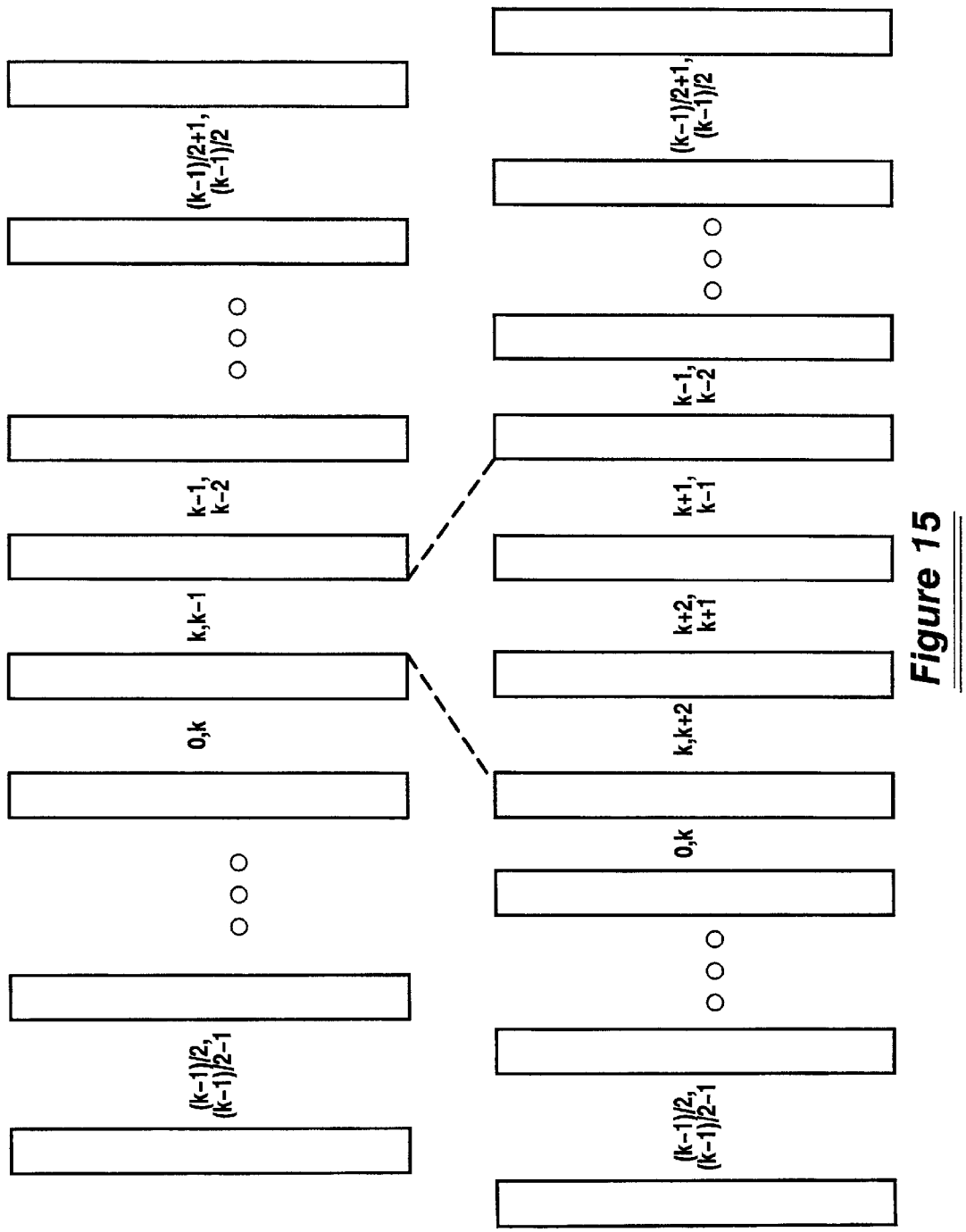
FIG. 15 is a diagram which illustrates in its upper portion a number of columns, and which shows how this generalized embodiment may be expanded to include two additional columns of switches in the middle of the network in order to maintain the longest interconnection wires on the top layer between the two new additional columns of switches.

FIG. 15 is a diagrammatic illustration which illustrates how a generic network shown at the top of FIG. 15 can be expanded into the next larger size network (four times larger) by adding two columns contained in one additional panel and new top layer while retaining the longest wires at the center of the network. In the bottom expanded network the values of k+2, k+1 from the original network may be set equal to k', and k'−1), respectively.

The manner in which expansion may be implemented is described below where:

N=p=number of rows in the network.

k=log$_2$N−1—highest address bit.

For example, start with a 32-row network. (You can start with any size network where k is even.) Rotate the columns, as previously described, to put the longest wires in the middle (FIGS. 4a–4d and 5a–5d). The network may then be actually, or only conceptually or graphically, folded in the middle where fold is at the longest wires (see FIGS. 5a–5d). Each set of 2 columns overlap after the folding is assigned to a different panel of switch chips. The basic sub-panels from which any size network may be built consist of 16 switch chips each for manufacturing ease. Other sizes can be chosen. Assuming there are 2N switch chips per panel, then there are 2N/16 sub-panels per full panel. The panels have no wiring other than connections directly to the switch chips plus power and ground. The layers of panels are stacked with wiring between the panels. The wiring is 3-dimensional connecting between adjacent layers. There then are $(1+\log_2 N)/2$ active panel layers. Only the very top layer of wires connects to the same panel since that is the only panel that has adjacent columns in the network. All other layers of wiring connect between adjacent panels. The bottom layer of wiring connects to the nodes and contains both the request and response sides of the network. The maximum distance between switch centers is $$\frac{\sqrt{2N}}{2}$$

since there are 2N switch chips per layer and the longest wire goes half way across a layer. From FIGS. 8, 9 and 10, it is seen that the longest wire spans 4 chips for N=32.

$$\frac{\sqrt{2*32}}{2} = 4.$$

When expanding the network size by a factor of 4, the routing address bit ordering is no longer a simple rotation of the standard ordering of the network. The modified ordering preserves the wiring of the lower ordered layers. Expansion of a network, as shown in FIG. 15, may be obtained either by construction or by formula.

Figure 16:
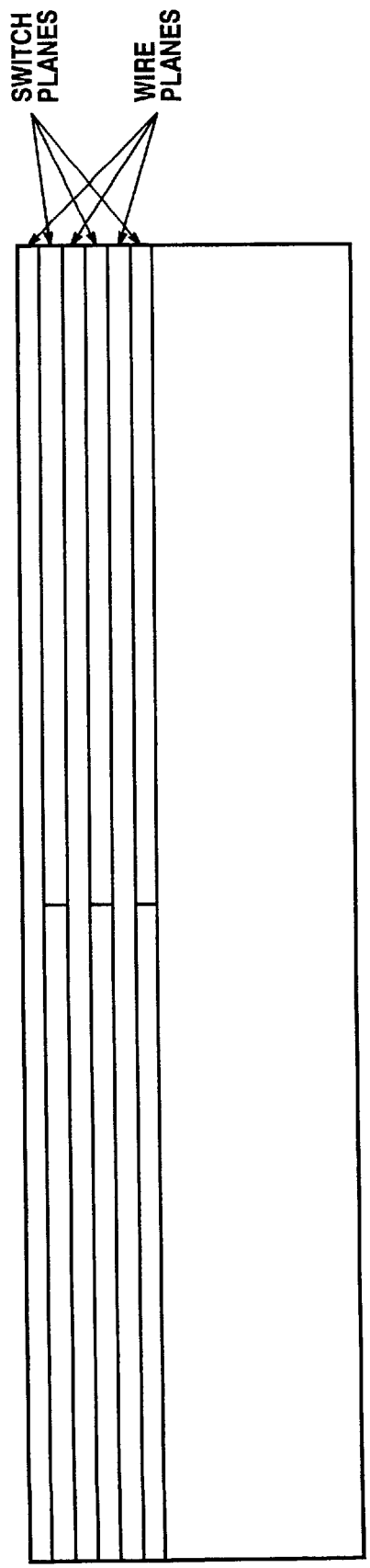
FIG. 16 is an edge view of a three-switch plane stack of switches, which are separated by three wire-planes.

FIG. 16 shows an edge view of an implemented "four-square" network, which shows a three-switch plane stock separated by three wire planes.

| Expansion by Construction Method | | | | | | | | | |
|---|---|---|---|---|---|---|---|---|---|
| Rows k | Routing address bits | | | | | | | | |
| Normal network ordering | | | | | | | | | |
| 32   4 |   |   | 0,4 | 4,3 | 3,2 | 2,1 | 1,0 |   |   |
| Rotate | | | | | | | | | |
| 32   4 |   | 1,0 | 0,4 | 4,3 | 3,2 | 2,1 |   |   |   |
| Delete center column | | | | | | | | | |
| 128   6 |   | 1,0 | 0,4 |   | 3,2 | 2,1 |   |   |   |
| Move out left and right 1 column | | | | | | | | | |
| 128   6 |   | 1,0 | 0,4 |   |   | 3,2 | 2,1 |   |   |
| Fill in 3 center columns | | | | | | | | | |
| 128   6 |   | 1,0 | 0,4 | 4,6 | 6,5 | 5,3 | 3,2 | 2,1 |   |
| Delete center column | | | | | | | | | |
| 512   8 |   | 1,0 | 0,4 | 4,6 |   | 5,3 | 3,2 | 2,1 |   |
| Move out left and right 1 column | | | | | | | | | |
| 512   8 |   | 1,0 | 0,4 | 4,6 |   |   | 5,3 | 3,2 | 2,1 |
| Fill in 3 center columns | | | | | | | | | |
| 512   8 |   | 1,0 | 0,4 | 4,6 | 6,8 | 8,7 | 7,5 | 5,3 | 3,2 2,1 |
| Delete center column | | | | | | | | | |
| 2048  10 |   | 1,0 | 0,4 | 4,6 | 6,8 |   | 7,5 | 5,3 | 3,2 2,1 |
| Move out left and right 1 column | | | | | | | | | |

| -continued | | | | | | | | | | |
|---|---|---|---|---|---|---|---|---|---|---|
| Expansion by Construction Method | | | | | | | | | | |
| Rows k | Routing address bits | | | | | | | | | |
| 2048  10 | 1,0 | 0,4 | 4,6 | 6,8 |   |   | 7,5 | 5,3 | 3,2 | 2,1 |
| Fill in 3 center columns | | | | | | | | | | |
| 2048  10 | 1,0 | 0,4 | 4,6 | 6,8 | 8,10 | 10,9 | 9,7 | 7,5 5,3 | 3,2 | 2,1 |
| stage |   | 0 | 1 | 2 | 3 | 4 | 5 | 6 | 7 | 8 | 9 | 10 |
| stage |   | 0 | 1 | 2 | 3 | 4 | k/2 | ... |   | k–2 | k–1 | k |

The general formula for a particular k is (split on 2 lines for clarity of the formulas):

| Stage | 0 | 1 | 2 | 3 | 4 | k/2 | ... | k–2 | k–1 | k |
|---|---|---|---|---|---|---|---|---|---|---|
| p1c | 1 | 0 | 4 ... | k–4 | k–2 | k | k–1 | k–3 ... | 5 | 3 |
|     | 2 | | | | | | | | | |
| p0c | 0 | 4 | 6 ... | k–2 | k | k–1 | k–3 | k–5 ... | 3 | 2 |
|     | 1 | | | | | | | | | |

Note the outer 4 are special cases and do not fit the formula progression. The formula progression always stops on the left at 4,6 and on the right at 5,3. Now relate the address bits to the stage number (except for the outer 4).

| stage=s | P1c | p0c |
|---|---|---|
| 0 | 1 | 0 |
| 1 | 0 | 4 |
| 2 ... K/2–1 | 2s | 2(s+1) = p1c + 2 |
| k/2 | K | k–1 |
| k/2+1 ... k–2 | k–2(s–k/2)+1 | k–2(s–k/2)–1=p1c–2 |
| k–1 | 3 | 2 |
| k | 2 | 1 |

The end conditions check as shown by:
s=2
p1c=2s+2*2=4
p0c–2(s+1)=2(2+1)=6=p1c+2
s=k/2–1
p1c=2s=2*(k/2–1)=k–2
p0c=2(s+1)=2*(k/2–1+1)=k=p1c+2
s=k/2+1
p1c=k–2(s–k/2)+1=k–2*(k/2+1–k/2)+1=k–2+1=k–1
p0c=k–2(s–k/2)–1=k–2*(k/2+1–k/2)–1=k–2–1=k–3= p1c–2
s+k–2
p1c=k–2(s–k/2)+1=k–2*(k–2–k/2)+1=k–(2k–4–k)+1=k– (k–4)+1=5
p0c=k–2(s–k/2)–1=k–2*(k–2–k/2)–1=k–(2k–4–k)–1= k–(k–4)–1=3=p1c–2

There are many equivalent ways to order the address bits depending on how many special cases you want on the two ends. One such example is:

| Rows k | Routing address bits | | | | | | | | |
|---|---|---|---|---|---|---|---|---|---|
| stage |   | 0 | 1 | 2 | 3 | 4 | 5 | 6 | 7 | 8 |
| stage | 0 | 1 | 2 | 3 | k/2 | ... | k–2 | k–1 | k |
| 512  8 | 0,2 | 2,4 | 4,6 | 6,8 | 8,7 | 7,5 | 5,3 | 3,1 | 1,0 |

With this example the only special case is on the far right. This example is represented in the table below.

| stage=s | P1c | p0c |
|---|---|---|
| 0 ... k/2−1 | 2s | 2(s+1) = p1c +2 |
| k/2 | K | k−1 |
| k/2+1 ... k−1 | k−2(s−k/2)+1 | k−2(s−k/2)−1=p1c−2 |
| k | 1 | 0 |

The more general case only directly specifies where the k and k−1 address bits go, which is where the longest wires are. It is those wires that change when going to larger networks and so they must be in the middle columns. Remember that the middle-wiring column ends up at the top of the network.

| stage | 0 | 1 | 2 ... | k/2−2 | k/2−1 | k/2 | k/2+1 | k/2+2 | ... | k−2 | k−1 | k |
|---|---|---|---|---|---|---|---|---|---|---|---|---|
| p1c | $P_0$ | $P_1$ | $P_2$ ... | $P_{k/2-2}$ | $P_{k/2-1}$ | k | k−1 | $P_{k/2}$ | ... | $P_{k-4}$ | $P_{k-3}$ | $P_{k-2}$ |
| p0c | $P_1$ | $P_2$ | $P_3$ ... | $P_{k/2-1}$ | k | k−1 | $P_{k/2}$ | $P_{k/2+1}$ | ... | $P_{k-3}$ | $P_{k-2}$ | $P_0$ | where $k=\log_2 N-1$=Highest address bit and the set $\{P_0 \ldots P_{k-2}\}$ is any permutation of the set $\{0 \ldots k-2\}$. The expansion to larger size networks is then the same as the construction method in paragraph 3 and the formulas are the same except the end points are different to take into account the permutations. Further, the 2 new address bits (k+1, k+2) can also be permuted as shown below for the (k, k−1) case.

Another valid arrangement swaps k and k−1:

| stage | 0 | 1 | 2 ... | k/2−2 | k/2−1 | k/2 | k/2+1 | k/2+2 | ... | k−2 | k−1 | k |
|---|---|---|---|---|---|---|---|---|---|---|---|---|
| p1c | $P_0$ | $P_1$ | $P_2$ ... | $P_{k/2-2}$ | $P_{k/2-1}$ | k−1 | k | $P_{k/2}$ | ... | $P_{k-4}$ | $P_{k-3}$ | $P_{k-2}$ |
| p0c | $P_1$ | $P_2$ | $P_3$ ... | $P_{k/2-1}$ | k−1 | k | $P_{k/2}$ | $P_{k/2+1}$ | ... | $P_{k-3}$ | $P_{k-2}$ | $P_0$ |

The wiring can also be extended to other networks, including layered networks having more than 2 layers by similar rules to the general case presented above. Layered and layers in this sense has the meaning ascribed to these words in the U.S. Pat. No. 4,833,468. This invention is not limited to just layered networks, however, it applies to any network that uses a plurality of row-routing address bits to route between adjacent columns of switches. For example, the invention also applies to single-layer networks, such as the Banyan or baseline network, as follows:

| stage | 0 | 1 | 2 ... | k/2−2 | k/2−1 | k/2 | k/2+1 | k/2+2 | ... | k−2 | k−1 | k |
|---|---|---|---|---|---|---|---|---|---|---|---|---|
| bit | $P_0$ | $P_1$ | $P_2$ ... | $P_{k/2-2}$ | $P_{k/2-1}$ | k | $P_{k/2}$ | $P_{k/2+1}$ | ... | $P_{k-3}$ | $P_{k-2}$ | $P_{k-1}$ | where $k=\log_2 N-1$=Highest address bit, and the set $\{P_0 \ldots P_{k-1}\}$ is any permutation of the set $\{0 \ldots k-1\}$. The expansion to larger size networks is then the same as the construction method described above. The formulas are the same except the end points are different to take into account the permutations. The network expansion method of this invention applies to any network that uses binary routing with any number of address bits routed per switch.

Although the present invention and its advantages have been described in detail, it should be understood that various changes, substitutions and alterations can be made herein without departing from the spirit and scope of the invention as defined by the appended claims.

What is claimed is:

1. A method of configuring and constructing a multi-stage switching network comprising a plurality of switches arranged into a plurality of rows and a number of columns, wherein a design configuration network is established in which the number of columns is even and is 4 or more, and the number of rows is even and is 2 or more, and the interconnection paths between the switches of one column and the switches of the adjacent columns are determined by a predefined network topology definition, comprising the steps of:

(a) conceptually rotating the columns of switches and interconnection paths between switches of said design configuration network to place the two adjacent columns with the longest interconnection paths between them so they are positioned to be the center-most pair of columns of switches of said design configuration network, (b) conceptually folding said design configuration network on a line between the two adjacent center-most columns of switches to form upper and lower overlapping levels of switches, wherein each column of said switches of said upper level forms one column of a pair of columns that overlies a column of said switches of said lower level that forms the other column of said pair of columns, (c) constructing a physical network in accordance with the design configuration network of steps (a) and (b) and further:

(1) arranging said switches of each pair of said columns of said design configuration network into a panel such that pairs of switches whose row numbers differ by a single bit are assigned a rank number that corresponds to a physical row number, (2) wiring all interconnection paths between said switches on all of said panels, except for those between said center-most pair of files, with wiring that completes interconnections between overlapping ones of said panels by following paths that extend between said panels according to said predefined network topology definition, and (3) wiring said longest interconnection paths between said switches in said center-most files which reside in said panel that contains both of said center-most pair of files of said switches by wiring that completes interconnections between said switches of said center-most pair of files of said switches in a single plane according to said predefined network topology definition.

2. A method of configuring and constructing multi-stage switching networks, as claimed in claim 1, wherein said interconnection paths are only partially utilized to construct networks with an arbitrary number of ports.

3. A method of configuring and constructing large multi-stage switching networks from four smaller networks each of which was constructed according to the method of claim 1 comprising the further steps of:

(a) removing the top-most layer of interconnection paths from said smaller networks;

(b) adding an additional panel of switches which is four times larger than the panel of switches used in each of said smaller networks;

(c) adding connection paths between said additional panel of switches and said switches of said smaller networks according to said network topology definition; and (d) adding wiring interconnection paths between switches in said additional panel according to said network topology definition.

4. A method of configuring and constructing multi-stage switching networks, as claimed in claim 3, wherein said interconnection paths are only partially utilized to construct networks with an arbitrary number of ports.

5. A method of configuring and constructing a multi-stage switch network comprising a plurality of switches arranged into a plurality of rows and a number of columns, wherein the number of columns is even and is 4 or more, the number of rows is even and is 2 or more and electrical interconnection paths between the switches of one column and the switches of the adjacent columns are initially configured by a predefined network topology definition comprising the steps of:

(a) conceptually rotating the columns of switches and interconnection paths between switches of said design configuration network to place the two adjacent columns with the longest interconnection paths between them so they are positioned to be the center-most pair of columns of switches of said design configuration network, (b) conceptually folding said design configuration network on a line between the two adjacent center-most columns of switches to form upper and lower overlapping files of switches on upper and lower levels, respectively, wherein each file of said switches of said upper level forms one file of said switches that overlies one file of said file switches of said lower level, (c) making all interconnection wiring paths between said switches on said upper and lower layers, except for those between said two adjacent files, by wiring path connections that run through said upper and lower layers, and (d) making said longest wiring path interconnections between switches in said two adjacent files without running said longest wiring paths through said upper and lower layers.

6. A method of constructing a multi-stage switch network comprising a plurality of switches arranged into a plurality of rows and a number of columns, wherein the number of columns is even and is 4 or more, and the number of rows is even and is 2 or more, comprising the steps of:

(a) implementing a network configured on a plurality of circuit cards wherein each circuit card contains all of the switches of a first column of the network of switches that are located nearer to an input side than to an output side of said network, and a second file of switches that is located nearer to the output side than the input side of said network so that both said first and second files are located at the same file position relative to said input and said output sides, respectively, (b) positioning said plurality of network circuit cards so that said first file of switches and said second file of switches are located in a lower-most layer of switches, and a third file of switches that is one file removed from said first file, and a fourth file of switches that is one file removed from said second files, and each succeeding file of switches that are one file further removed from said first and second file of switches, respectively, are located on the next lower-most layer of switches, and said switches that are located in all but said lower layer overlie the switches that are located in the next lower layer, (c) interconnecting wiring paths between said files of switches in all of said layers, except for switches on the two center-most files of the network, with wiring paths through said circuit cards, and (d) interconnecting wiring paths between switches in said two center-most files of switches without running said wiring paths through any of said circuit cards.

7. A method of constructing a multi-stage switch network, as set forth in claim 6, comprising the further steps of rotating the files of switches of said network to place the two adjacent files of said networks that have the longest wiring paths of the network between switches in two files at the center-most files of the networks.

8. A method of construction of a multi-stage switch network, as claimed in claim 6, comprising the further step of replicating said circuit cards so as to add an even number of additional circuit cards to each of said layers, which are identical to the other circuit cards of the same layer, and that are located and wired so that the wiring pattern of elements (s)–(d) of claim 6 is maintained with respect to said circuit cards.

9. A method of constructing a multi-stage switch network, as set forth in claim 8, comprising the further steps of rotating the files of switches of said network to place the two adjacent files of said networks that have the longest wiring paths of the network between switches in two files at the center-most files of the networks.

10. A method of expanding a multi-stage switch network, which comprises a plurality of rows and a number of columns, wherein the number of columns is even and is 4 or more, and the number of rows is even and is 2 or more, and the network has been formed by the steps comprising:

(a) implementing a network configured on a plurality of circuit cards wherein each circuit card contains all of the switches of a first file of the network of switches that are located nearer to an input side than to an output side of said network, and a second file of switches that are located nearer to the output side than the input side of said network so that both said first and second files are located at the same file position relative to said input and said output sides, respectively, (b) positioning said plurality of network circuit cards so that said first file of switches and said second file of switches are located in a lower-most layer of switches, and a third file of switches that is one file removed from said first file, and a fourth file of switches that is one file removed from said second file, and each succeeding file of switches that are one file further removed from said first and second files of switches, respectively, are located on the next lower-most layer, and said switches that are located in all of switches, and said switches that are located in all but said lower layer overlie the switches that are located in the next lower layer, and (c) interconnecting wiring paths between said files of switches in all of said layers, except for switches on the two center-most files of the network, with wiring paths through said circuit cards.

* * * * *